IN LOCATION ④

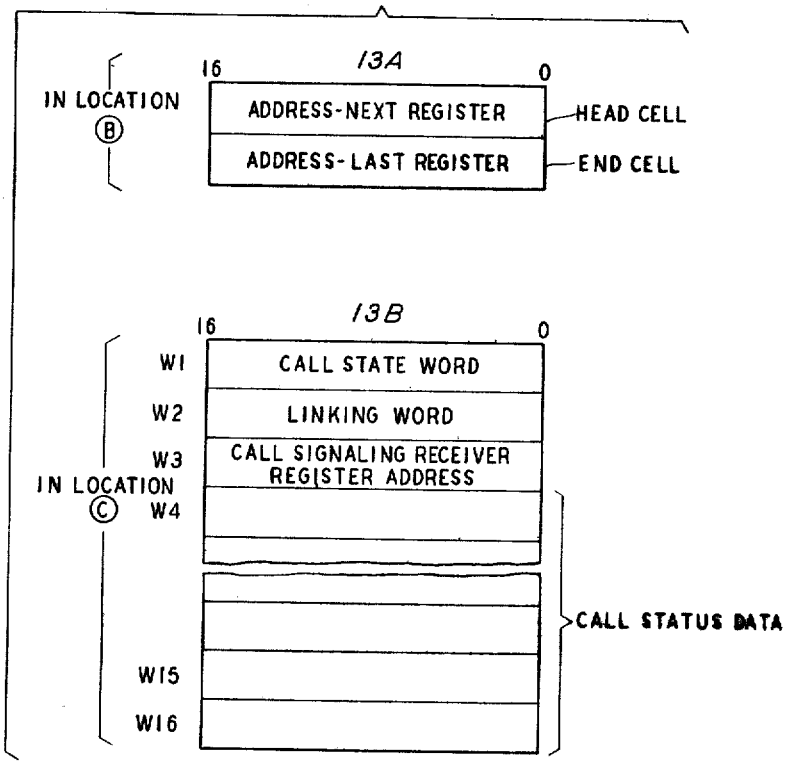

| 36 | 21 20 | 0 |
|---|---|---|
| NOT USED | ADDRESS OF DATA BLOCK IN LOCATION ⑤ | |

14B

| 36 | 18 17 | 0 |
|---|---|---|
| NOT USED | ADDRESS IN LOCATION ⓒ OF THE FIRST NETWORK TERMINAL REGISTER OF THE FIRST NETWORK FRAME | |
| NOT USED | ADDRESS IN LOCATION ⓒ OF THE FIRST NETWORK TERMINAL REGISTER OF THE LAST NETWORK FRAME | |

PREPARED BY MANUFACTURER — VARIABLE CONTENT UNIQUELY DEFINES EACH OFFICE

14C

IN LOCATION ⑤

| 36 | 31 30 | 21 20 | 0 |
|---|---|---|---|
| NO. OF CALL REG GROUPS | NO. OF WORDS IN EACH CALL REGISTER | ADDRESS IN LOCATION ⓑ OF HEAD CELL FOR CALL REGISTERS | |

| 36 | 23 22 | 0 |
|---|---|---|
| NO. OF CALL REGISTERS IN FIRST GROUP | ADDRESS IN LOCATION ⓒ OF FIRST CALL REGISTER OF FIRST GROUP | |
| NO. OF CALL REGISTERS IN LAST GROUP | ADDRESS IN LOCATION ⓒ OF FIRST CALL REGISTER OF LAST GROUP | |

14D

FIRST CALL REGISTER OF GROUP

CALL STATE
REGISTER ACTIVITY STATE

| 22 | 20 | 15 14 | 0 |
|---|---|---|---|
| CALL STATE | JUNCTOR SUB GROUP | ORIGINATING TRUNK NETWORK TERMINAL NO. | |

| 22 | 11 10 | 0 |
|---|---|---|
| NETWORK PATH MEMORY | ABBREV TERM. TRK NETWORK TERMINAL NO. | |

IN LOCATION ⓒ

14E

| 22 | 18 17 | 0 |
|---|---|---|
| CALL PROG MARK | CALL REGISTER ADDRESS | |

NETWORK TERMINAL REGISTER

POSSIBLE STATES
1. IDLE
2. SERVED BY CALL PROCESSING REGISTER
3. OUT OF SERVICE
4. SERVED BY CALL REGISTER

United States Patent Office 3,495,220
Patented Feb. 10, 1970

3,495,220
PROCESS CONTROL SYSTEM INCLUDING HARDWARE ELEMENT STATUS MAP IN MEMORY
David A. Lawson, Glen Ellyn, Ralph W. Peterson, Naperville, and Alfred A. Stockert, Wheaton, Ill., assignors to Bell Telephone Laboratories, Incorporated, Murray Hill and Berkeley Heights, N.J., a corporation of New York
Filed May 15, 1967, Ser. No. 638,500
Int. Cl. G11b 13/00; G06f 1/00, 7/00
U.S. Cl. 340—172.5                    19 Claims

ABSTRACT OF THE DISCLOSURE

A communication switching system including a network element map in memory which defines the current states of hardware elements of a switching network. This map is used by a stored program controlled data processor to select network elements for the establishment of connections between communication circuits terminated on the switching network. Erroneous network element state information is corrected by analysis of call information in memory associated with each network connection to determine its plausibility and by arranging the network map and certain hardware to correspond with the results of the analysis.

BACKGROUND OF THE INVENTION

Field of the invention

The invention is concerned with the correction of data in an industrial process control system which simultaneously serves a number of tasks under the control of a program controlled processor. Such arrangements are of interest in a process control system in which the processor controls hardware in the performance of a task and maintains an independent memory record of the status of hardware elements which are engaged in the performance of tasks.

Description of the prior art

In the absence of errors or faults in the processor and in the controlled hardware of a process control system, there exists a direct correspondence between the hardware status information in the memory and the operational states of the hardware. Upon the occurrence of errors or of system faults, the system information in memory may be mutilated or the hardware may be operated incorrectly. In either case, the memory information and the operational states of the hardware will be in disagreement. In the course of normal operation, a number of tests are made to detect difficulty in system operation. Upon the detection of difficulty, steps may be taken to re-initialize certain data on the basis of algorithms and data stored in a secure or permanent memory. Since the status record of the hardware, which is employed in the performance of the process task, is of a transient nature and is generated as demands are served, it is impossible to reconstruct this information in the same manner.

Disagreement between the status record in memory and the operational states of the hardware may lead to a rapid degeneration of the control capability of the processor. That is, such disagreement will rapidly lead to such extensive disagreement between the status record and the actual operational states that further control of processes is impossible.

SUMMARY OF THE INVENTION

In accordance with this invention, the processor maintains a service task record in which there is maintained information concerning each service task being performed and, upon the occurrence of processing difficulty, the service task record is analyzed to determine its plausibility, the actual states of the task demand sources are examined, the status record of the hardware is made to reflect the results of the analysis, and the hardware elements are reconfigured to agree with the new memory record.

BACKGROUND OF THE INVENTION

It is an object of this invention to increase the reliability of a program controlled process control system.

In a copending application of A. H. Doblmaier—R. W. Downing—M. P. Fabisch—J. A. Harr—H. F. May—J. S. Nowak—F. F. Taylor—W. Ulrich, Ser. No. 334,875, filed Dec. 31, 1963, there is disclosed a program controlled telephone switching system. This is an example of an industrial process control system, wherein a status record of hardware elements (Network Map) is maintained in the memory independently of the actual hardware elements (network links, junctors, etc.) which are employed in the performance of the tasks which are controlled by the processor.

The above and other objects and features of this invention will be more readily understood from the following description when read with respect to the drawing in which.

Figure 1:
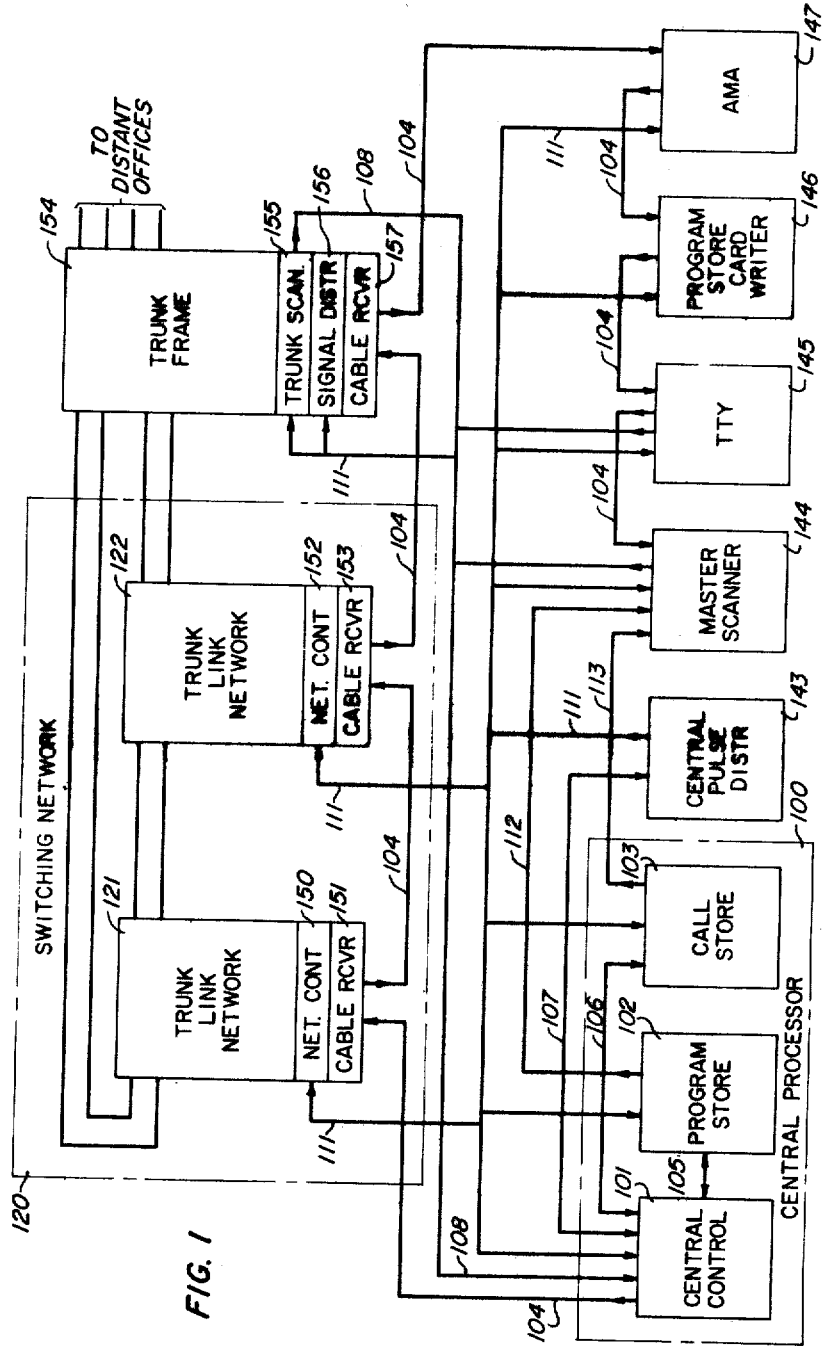
FIG. 1 is a general block diagram of a communication switching system as an illustrative embodiment of a process control system.
Figure 3:
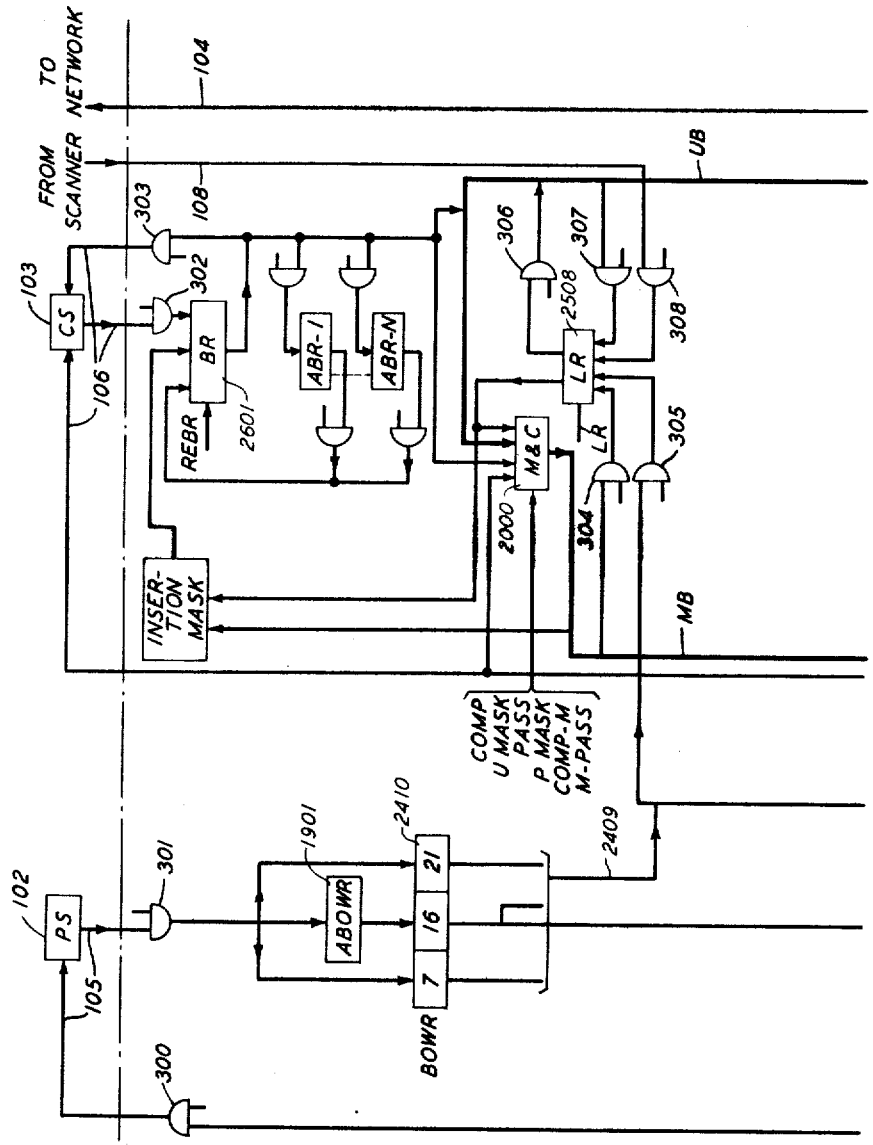
Figure 4:
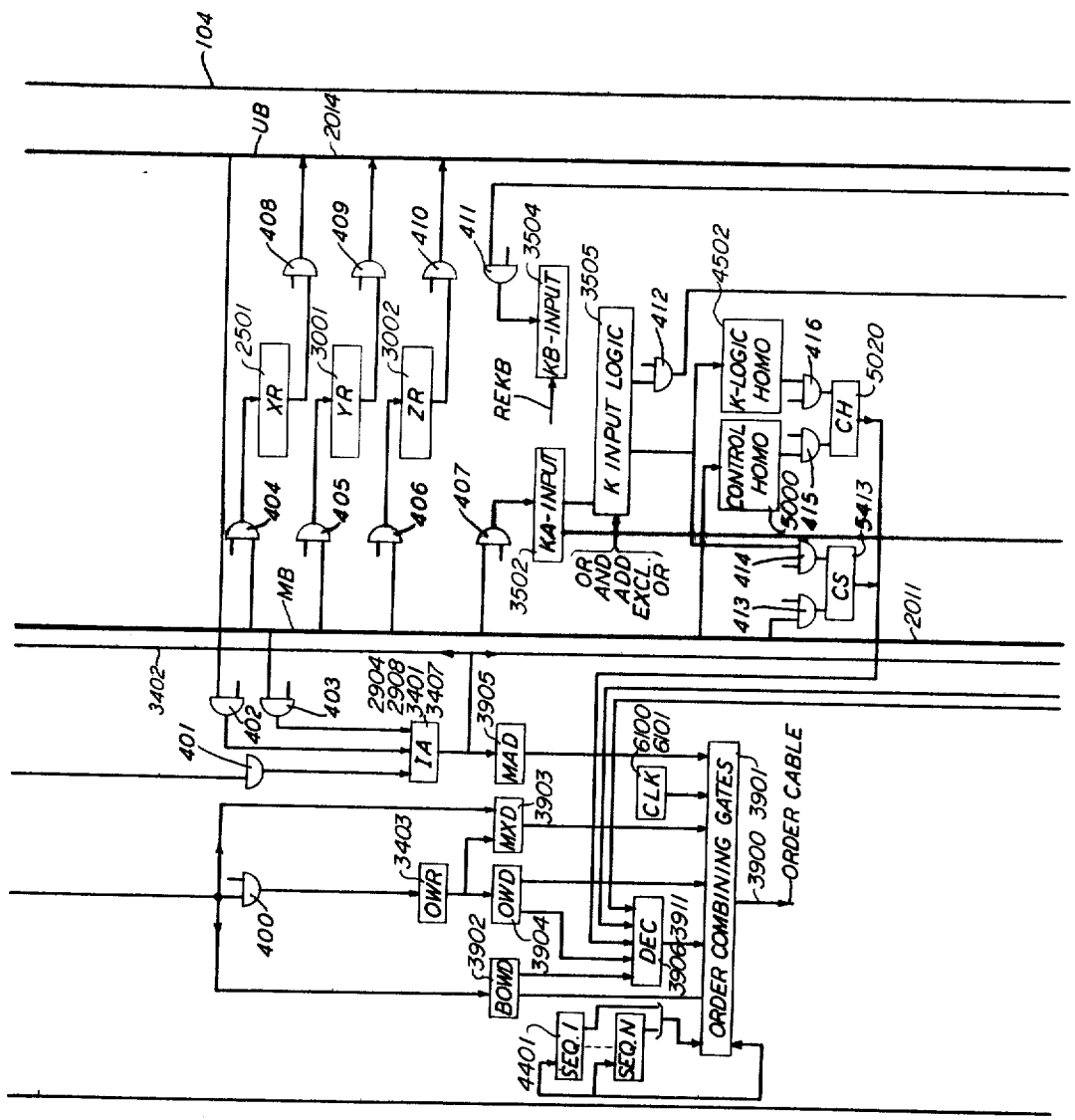
Figure 5:
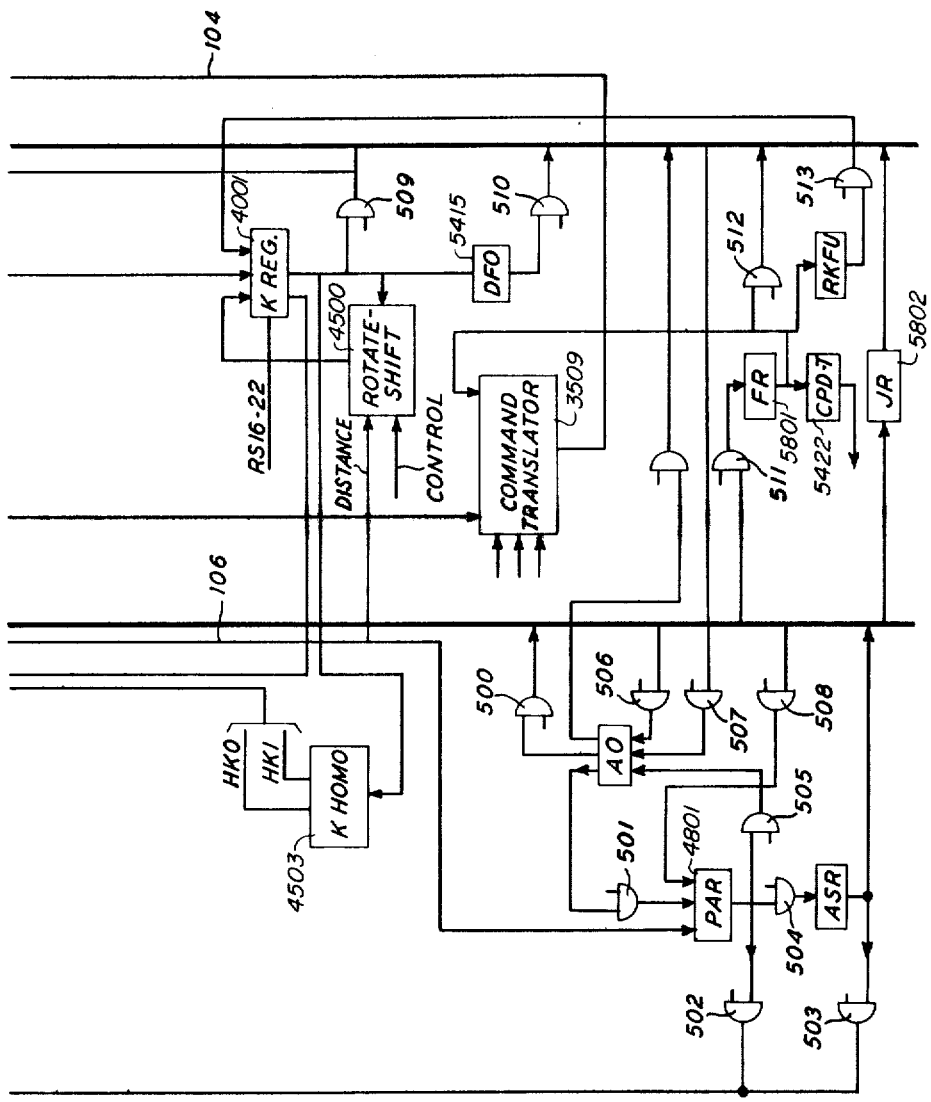
Figure 6:
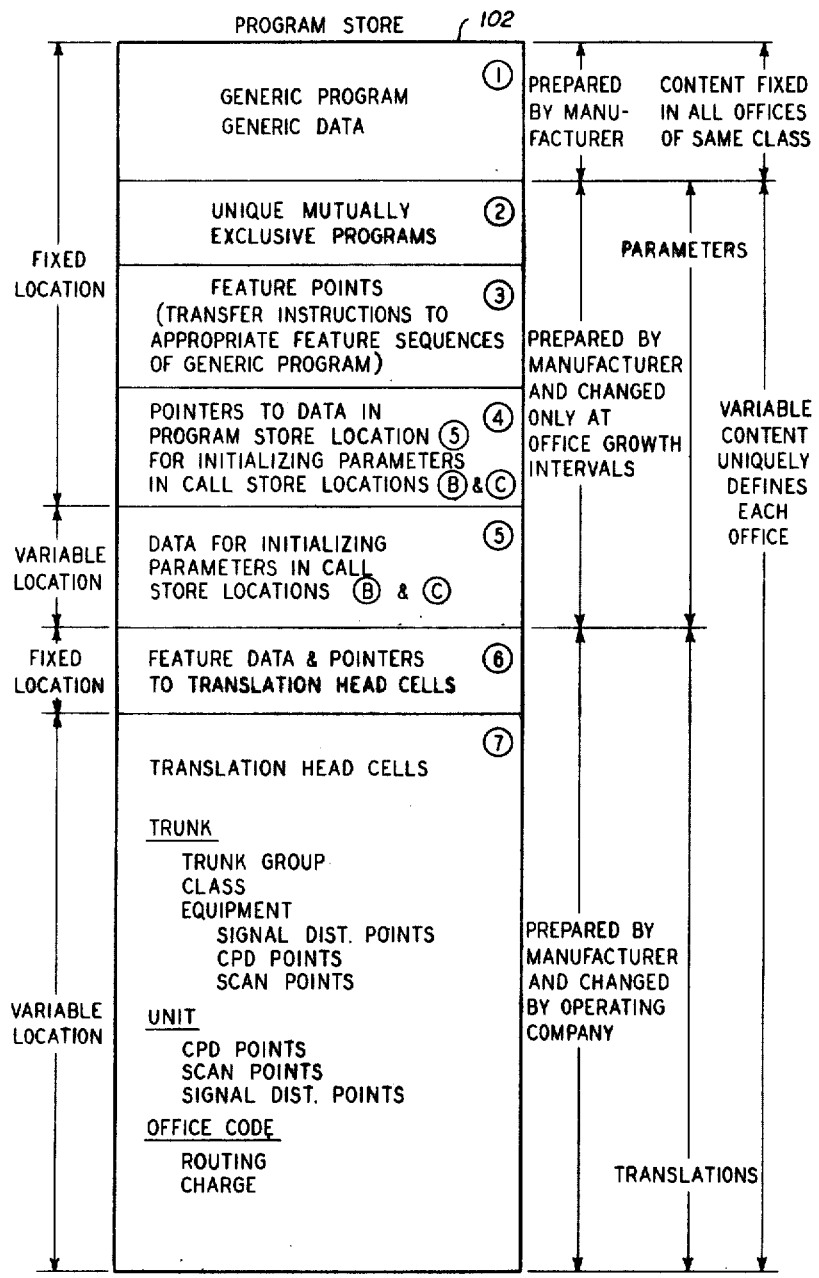
Figure 7:
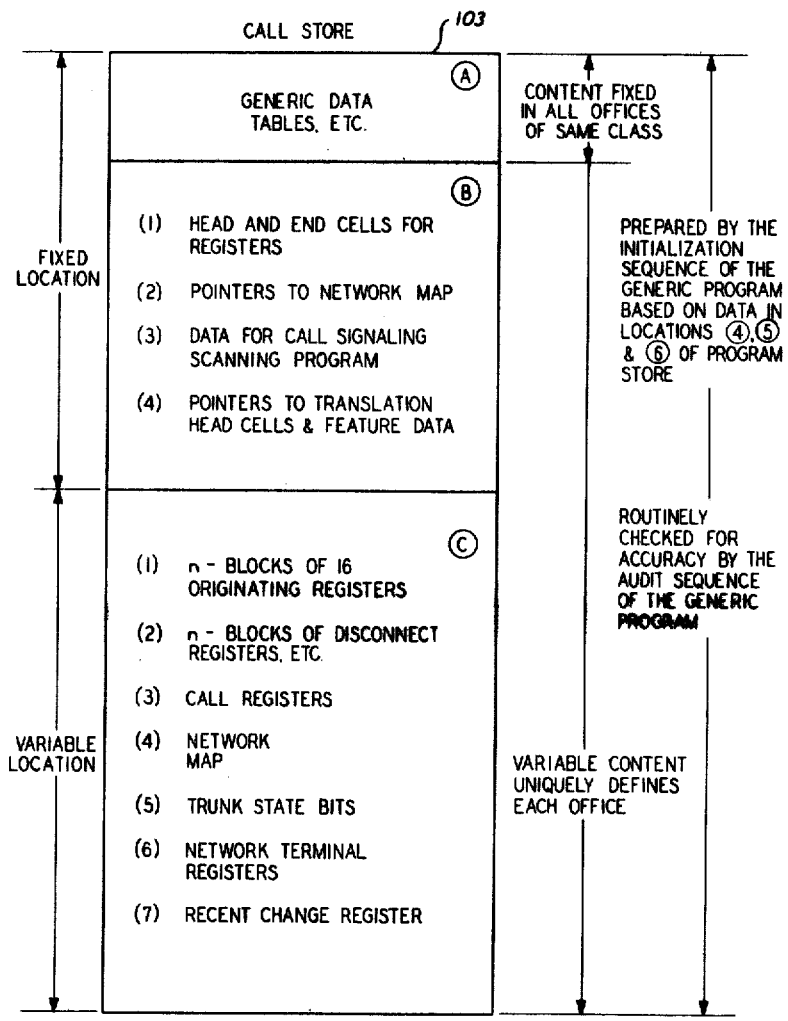
Figure 8:
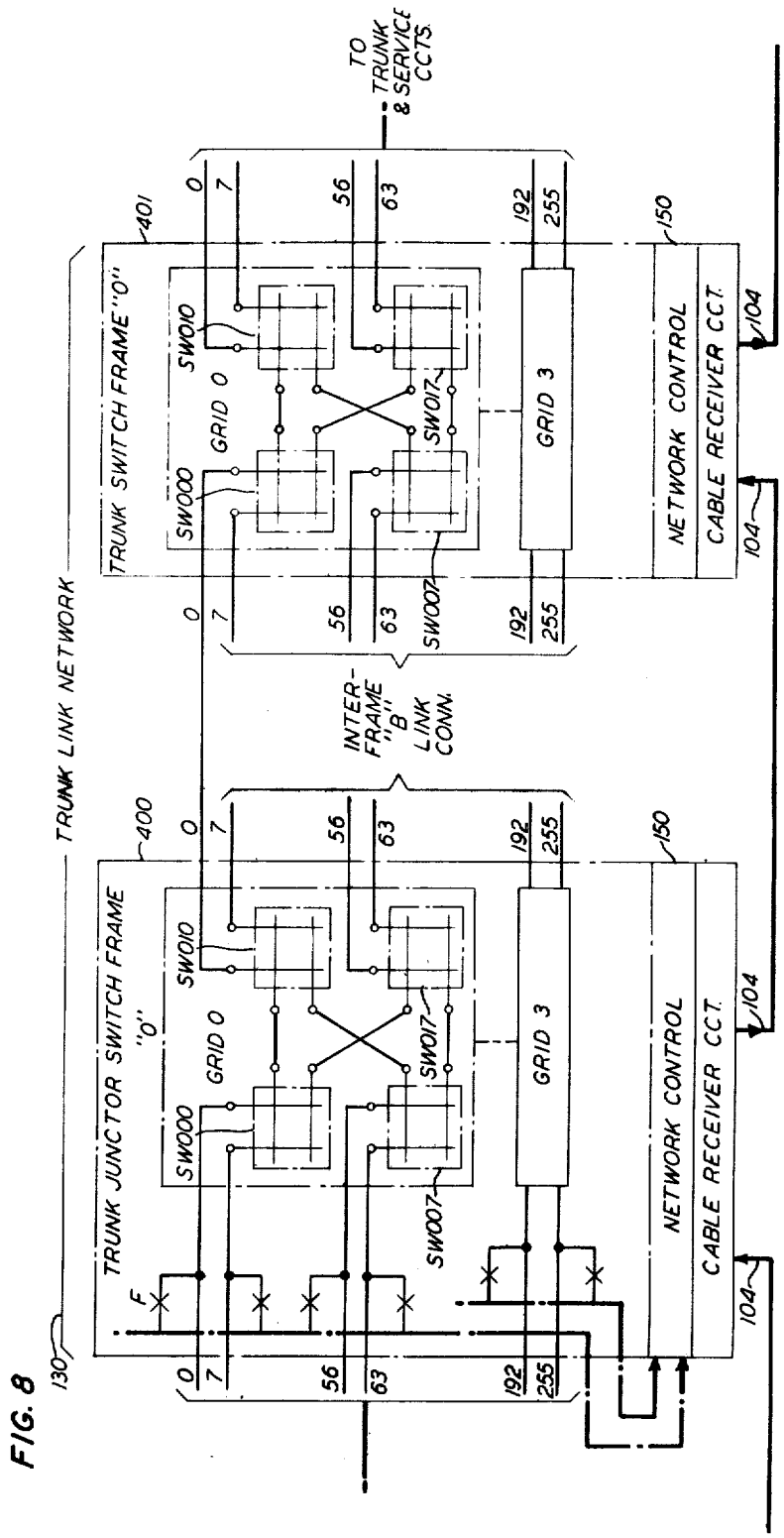
Figure 9A:
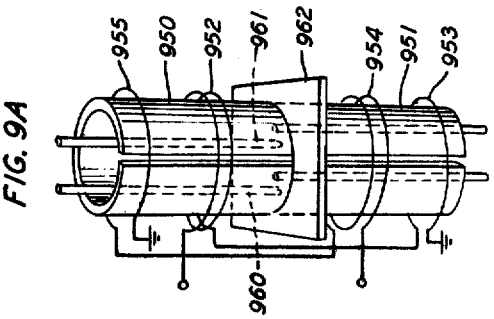
Figure 9:
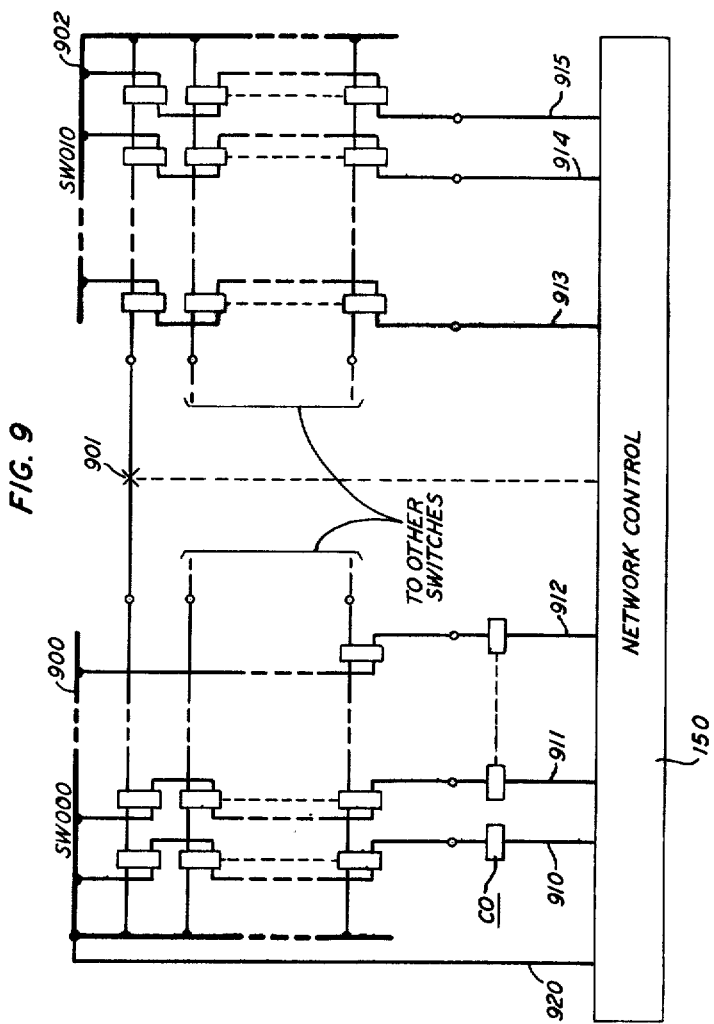
Figure 10:
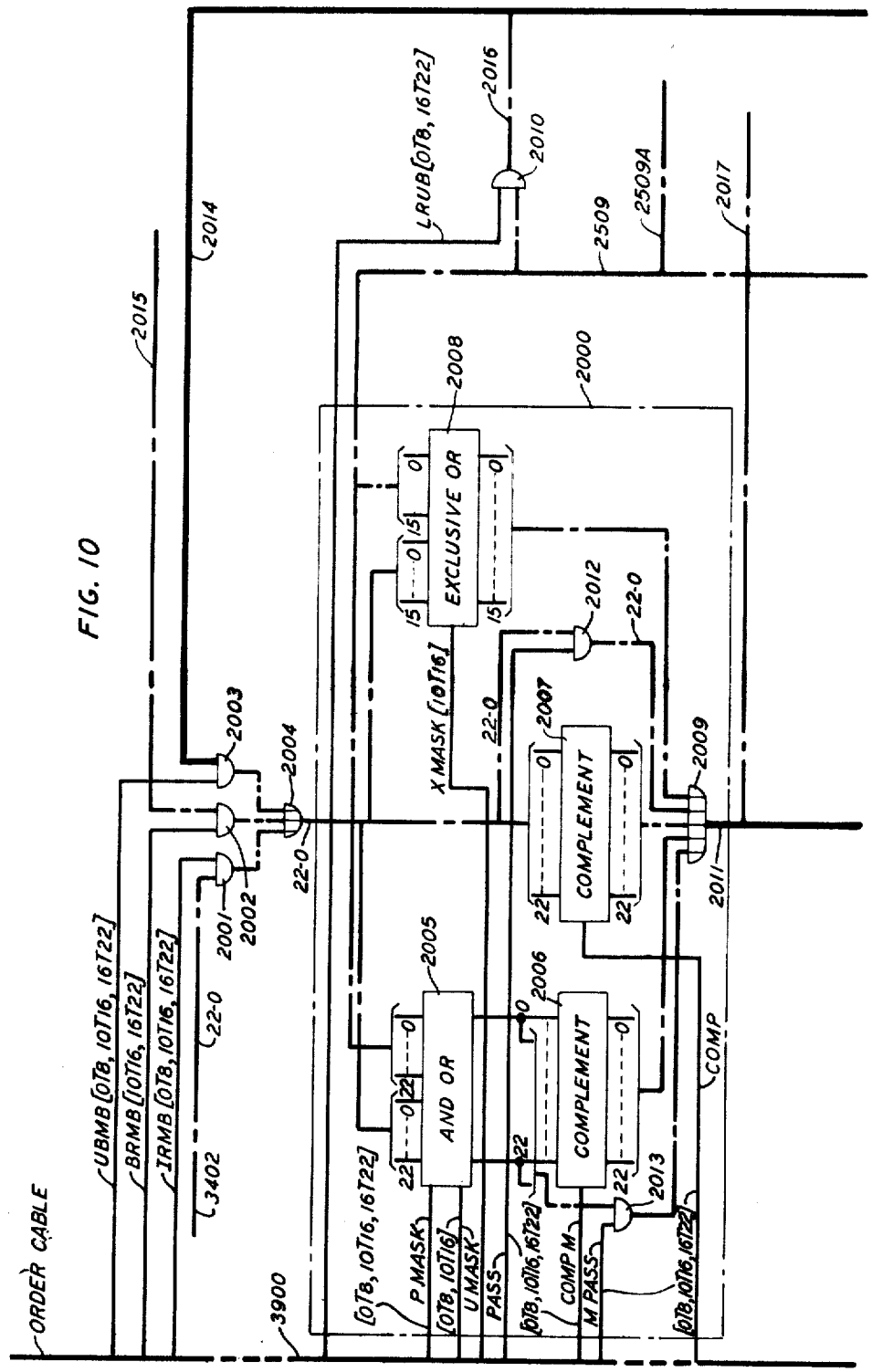
Figure 11:
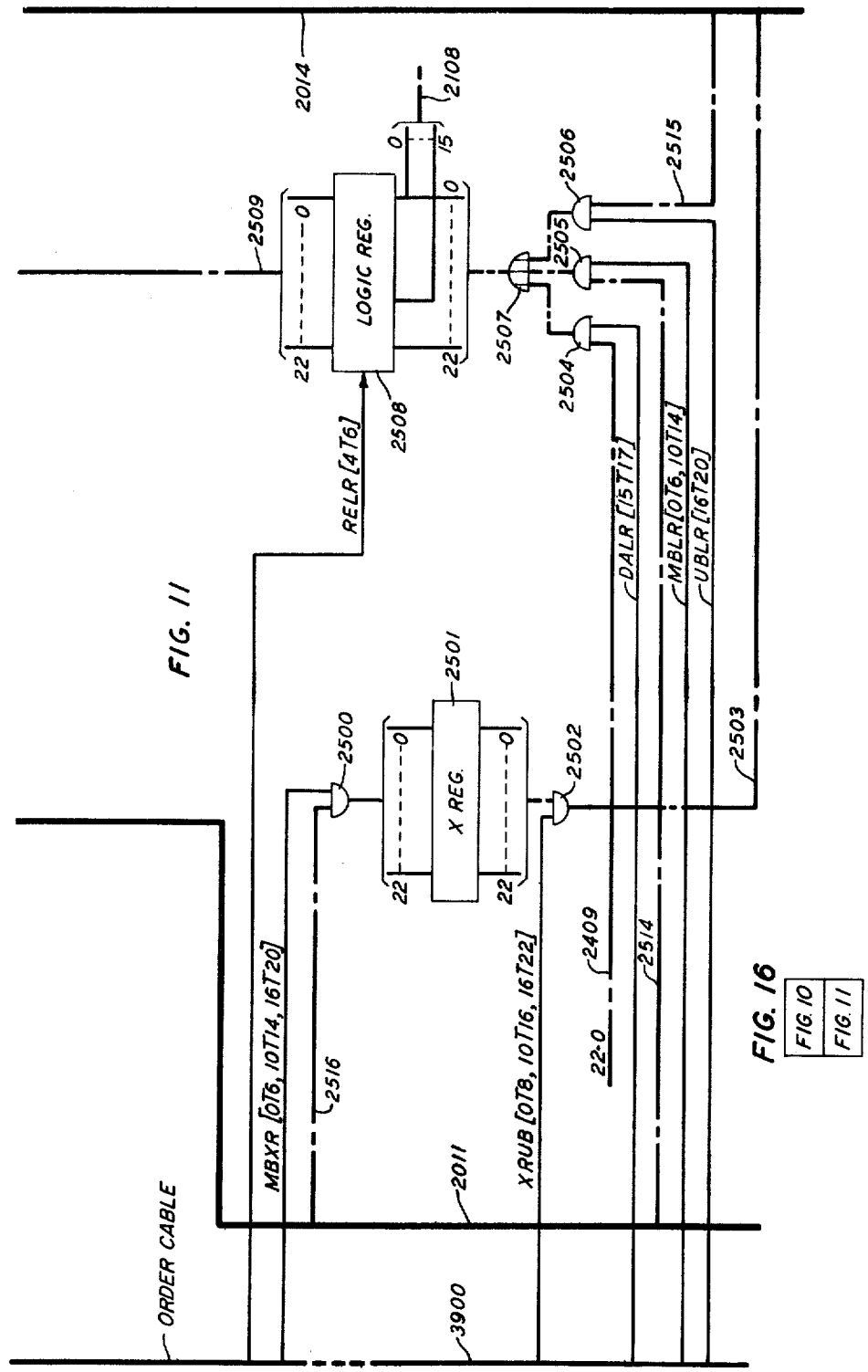
Figure 12:
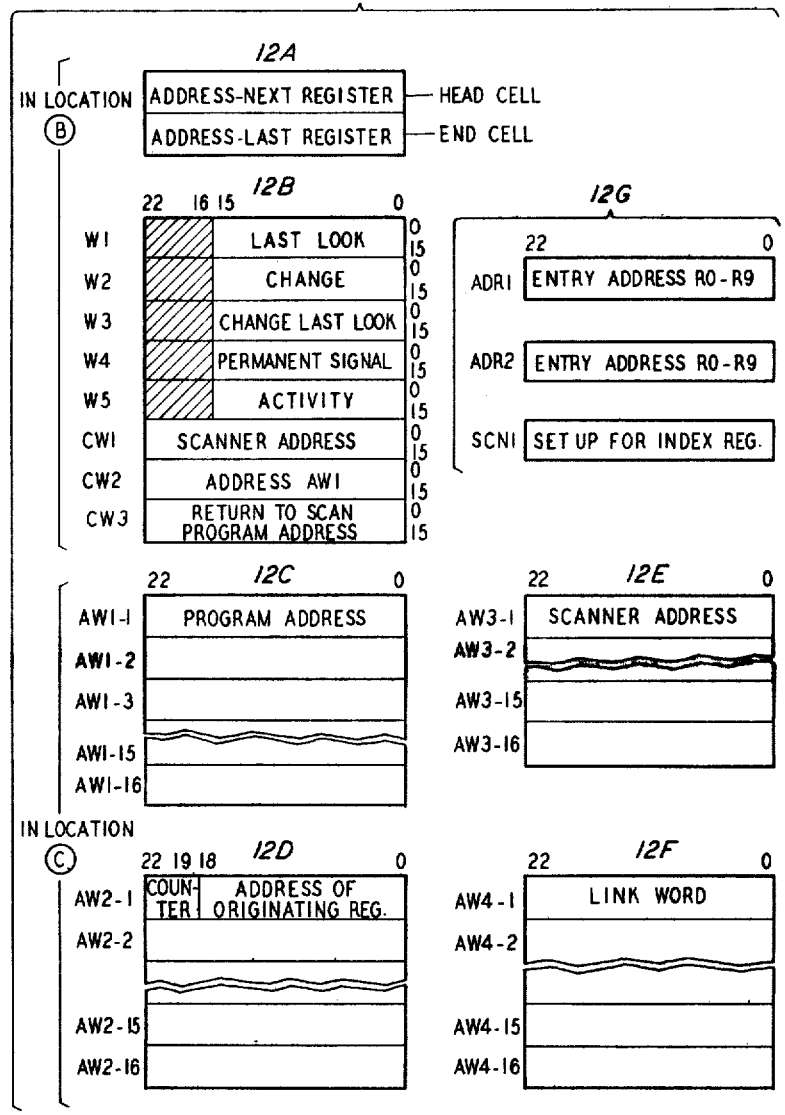

FIGS. 3–5 arranged as shown in FIG. 15 are a block diagram of the Central Processor of FIG. 1;

FIG. 6 shows an arrangement of information in the semipermanent system memory;

FIG. 7 shows an arrangement of information in the temporary memory;

FIGS. 8 and 9 show the details of the switching network of FIG. 1;

FIG. 9A shows an arrangement of a pair of ferreed switches;

FIGS. 10 and 11 arranged as shown in FIG. 16 show in detail a portion of the processor of FIGS. 3, 4 and 5;

FIGS. 12–14 shows a detailed organization of certain information within the memory; and FIGS. 15 and 16 show the arrangement of FIGS. 3, 4, 5 and FIGS. 10 and 11 respectively.

The communication switching system of FIG. 1 is an illustrative example of the application of a program controlled data processor to an industrial process. As seen in FIG. 1, the Central Processor 100 comprises the central control 101 and the memory system which in turn comprises the Program Store 102 and Call Store 103. The remaining elements shown in FIG. 1 may be classified as input-output devices for the Central Processor 100. In this illustrative example, the trunk scanner 155, the Teletype 145, and the master scanner 144 provide input signals to the Central Processor while the network controllers 150 and 152, the signal distributor 156, the AMA 147, the Program Store Card Writer 146, the Teletype 145, and the Central Pulse Distributor 143 all comprise output devices for the Central Processor 100. A description of a communication switching system is employed to illustrate the principles of our invention, which principles may also be applied advantageously to numerous other industrial process control applications of a program controlled processor.

The communication switching system of FIG. 1 has as its principal objective the provision of switching service to demands originating from a plurality of communication paths (the trunk circuits) which connect the switching network to the distant offices. The principal service rendered to the communication paths (trunks) is the establishment of connections through the network in accordance with demand information obtained from a calling communication path and the restoration of the communication paths and the network connections to idle states after a connection has served its purpose. The service rendered to communication paths in response to demands for service is termed a "service task" herein.

The switching network 120 only provides connections between communication paths and means for establishing and releasing such connections. The Central Processor 100 maintains a record of the operational states (active and inactive) of all network terminals and network links and also maintains a record of the makeup of every established or reserved path through the network. These records concerning the network are maintained in the Call Store 103 of the Central Processor 100. The record relating to the active-inactive states of the network elements is referred to herein as the Network Map or Hardware Map. The record of the makeup of the established and reserved paths through the network is service task oriented and may be termed a Service Task Map. The Central Processor 100 interprets demands for connections between specific pieces of equipment, i.e., between trunks and between trunks and service circuits and determines an available connection through the network by examining the connection requirements and the above-noted Network Map.

The following brief description of the switching network 120 is without regard for the number of trunks served by the network and the internal connections of the network. Detailed information as to the makeup of the network may be obtained from the following U.S. patents:

U.S. Patent 3,257,513 issued to A. Feiner on June 21, 1966; U.S. Patent 3,281,539 issued to K. S. Dunlap, A. Feiner, R. W. Ketchledge, and H. F. May on Oct. 25, 1966; and U.S. Patent 3,231,679 issued to T. N. Lowry on Jan. 25, 1966.

The network 120 is divided into two similar portions, namely, the trunk link networks 121 and 122. The trunk circuits which are located in the trunk frame 154 terminate on trunk terminals on one side of each of the trunk link networks 121 and 122. The terminals on the other side of each trunk link network are termed junctor terminals. Connections between the trunk link networks is by way of the junctor terminals. Additionally, in the trunk frame 154 there are a number of service circuits which also terminate on terminals of the trunk link networks 121 and 122. The service circuits provide the various tones required in the office, e.g., dial tone, ringing tone, audible, etc. and provide for the collection of call signaling information. During the course of establishing a connection through the network between two trunk circuits, connections are first established between the trunk circuits to be connected and service circuits. Subsequently talking path connections are completed between two trunks in accordance with information obtained from a calling trunk.

Each trunk link network 121, 122 comprises four switching stages without concentration between the trunk terminals and the junctor terminals. The junctor terminals of the trunk link network 121 are directly connected in accordance with a prescribed pattern to junctor terminals of the same trunk link network and junctor terminals of the other trunk link network. Thus, it is possible to complete a path through the switching network between two trunk circuits terminating on the same trunk link network or two trunk circuits terminating on different trunk link networks. For purposes of the immediately preceding discussion, connections between trunk circuits and service circuits may follow the same pattern.

Control of the network and the control and supervision of the trunk and service circuits is distributed through a number of control and supervisory circuits. This distribution of control and supervision provides a buffer between the high speed Central Processor 100 and the slower network elements. The principal control and supervisory elements are:

(1) The network control circuits which accept commands from the Central Processor 100 via the peripheral bus 104 and the enable cable 111. In response to such commands, the network control circuits selectively establish portions of a selected path through the network.

(2) The trunk scanner 155 which comprises a ferrod scanning matrix to which elements of the trunk circuits and the service circuits are connected for purposes of determining the supervisory states of the connected elements. The trunk scanners respond to commands from the central processor over the peripheral bus 104 and the enable cable 111 and transmit to the Central Processor 100 indications of the supervisory states (active and inactive) of a selected group of circuit elements defined by the command. In this one illustrative embodiment the scanning elements, i.e., ferrods, are arranged in ordered groups of 16 elements each.

(3) The signal distributors 156 which, in response to commands from the Central Processor 100 via the peripheral bus 104 and the enable cable 111, provide an operate or a release signal on a selected signal distributor output terminal. Signal distributor output signals are employed to operate and release control relays in the trunk and service circuits. A magnetically latched relay is used in these circuits for purposes of completing transmission paths and for circuit control in general. The signal distributors generate operate signals of a first polarity and release signals of an opposite polarity. The output signals comprise short pulses.

The switching network 120 of FIG. 1 is shown in greater detail in FIGS. 8, 9 and 9A. In FIG. 8 there is shown the transmission paths of a trunk link network and FIG. 9 sets forth certain of the control paths which parallel the transmission paths. In FIG. 8 there is shown the connections for a single trunk switch frame and a single trunk junctor switch frame. Each such frame serves 256 terminals. The trunk switch frames and the trunk junctor switch frames which make up a Trunk Link Network such as 121, 122 are interconnected by "B" links which are arranged in a prescribed pattern to provide the necessary access between trunk terminals and junctor terminals.

The basic crosspoint of all of the stages of the network comprises a pair of differentially wound ferreed switches such as is shown in FIG. 9A. A ferreed switch of the type employed herein is shown in United States Patent No. 3,075,059 issued Jan. 22, 1963. Each switch comprises a magnetic control member effectively divided into two Magnetic Control Members 950 and 951, one above the shunt plate 962 and one below the shunt plate. On each of these magnetic members there are wound two separate windings and in each case one of the windings on a magnetic member has approximately twice as many turns as the other winding on the same magnetic member. The windings on the two magnetic members are interconnected so that the winding 952 having the larger number of turns on the upper Magnetic Member 950 is connected in series with the winding 953 having the smaller number of turns on the lower magnetic member and, similarly, the remaining upper winding 955 and lower winding 954 are also serially connected. The interconnection is such that it is possible to coincidentally pulse both interconnected pairs of windings to effect closure of the associated crosspoint contacts 960, 961 and it is possible to pulse one serially connected pair or the other serially connected pair individually to effect release of the associated contact set.

The contacts of the ferreed switch, although they are enclosed in a controlled atmosphere, are not intended for completing the talking path of a telephone switching network. Accordingly, the closure of a talking path through selected stages of the network serves to prepare a path and in every case the final closure of the transmission path to provide talking battery is made by closing a wire spring relay in a trunk or a service circuit.

As seen in FIG. 9, the column conductors of the switch SW000 are discrete to a particular terminal. Similarly, the windings associated with the switches of a row are connected in series with each other. One end of each of the column control conductors is connected to the Network Control 150. The other ends of each of the column conductors are connected to the Common Bus 900. Similarly, the windings of the ferreeds of a row are connected in series with each other and one end of each of the windings is connected in series with a selection relay contact such as 901 to a row conductor of a switch such as SW010. The other ends of the control windings of the rows of the switch SW000 are similarly connected to the Common Bus 900. The link contacts such as the make contact 901 which is under the control of the Network Control 150 is employed in the process of selecting a path between terminals of a switch frame.

Similarly, one end of each of the row conductors of the switch SW010 and one end of each of the column conductors of the switch SW010 are also connected to a Common Bus 902. The Network Control 150 in response to commands from the Central Control 101 may selectively apply either a positive pulse or a negative signal to the common conductors 910, 911, and 912; may selectively apply either a positive pulse or a negative signal to the control conductors 914, and 915; or may selectively apply via conductor 920 either a positive pulse or a negative signal to the bus arrangement 900. With this range of available control signals and the selective control of the link relay contacts it is possible to perform all of the desired functions in the control of a Switch Frame.

Figure 2:
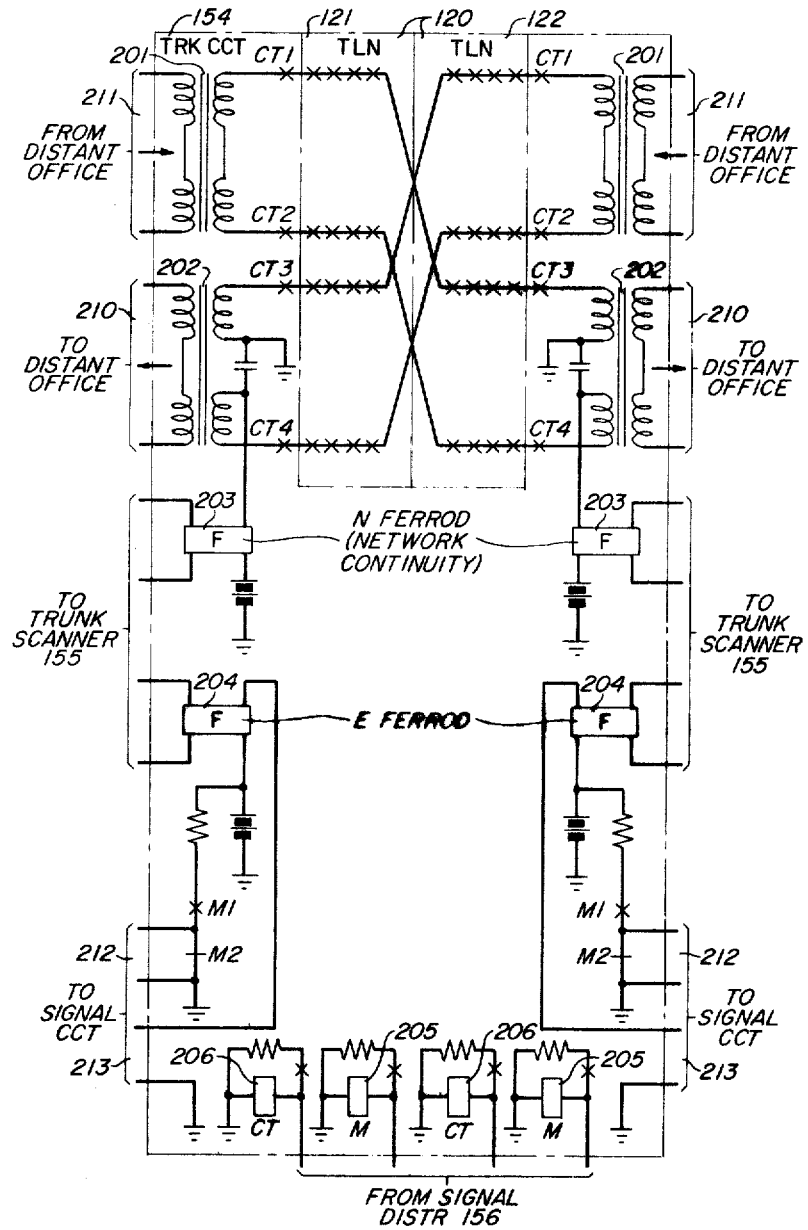
FIG. 2 is a diagram of a typical connection through the illustrative switching system of FIG. 1.

Two trunk circuits and a connection through the Network 120 are shown in FIG. 2. The two trunk circuits are identical. As seen in FIG. 2, the trunk circuits provide four-wire communication and, therefore, a four-wire path between trunk terminals is required through the network. The four-wire path involving eight switching stages is shown schematically connecting the network terminals of the left trunk circuit and the right trunk circuit of FIG. 2. Each trunk circuit comprises a first Transmission Coil 201, a second Transmission Coil 202, a Network Continuity Ferrod 203, a Receiving Signaling Ferrod 204, a Sending Signaling Relay 205 and a Cut-through Relay 206.

Figure 2A:
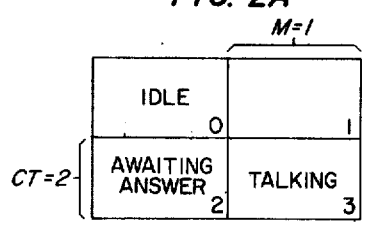
FIG. 2A shows the possible states which can be derived in a typical connection as shown in FIG. 2.

As seen by the state diagram (FIG. 2A), a trunk circuit employs three of the four possible states which can be derived by operation of the M and CT control relays in combination. State 0 (both the M and CT relays released) is reserved for the idle (inactive state) state of the trunk circuit. When the CT relay alone is operated, the trunk is in the awaiting answer state (intermediate state) from the trunk circuit to which it is connected by the path through the network and when both the CT and M relays are operated, the trunk circuit is in the talking state (active state).

Each trunk circuit is connected to a distant office by means of a Transmitting Path 210, a Receiving Path 211 and Transmitting and Receiving Signaling Circuits 212 and 213 respectively. That is, the trunk to the distant office is provided with E and M signaling and signals (on-hook and off-hook) are indictaed to the trunk circuit over the Receiving Signaling Circuit 213 and supervisory signals (on-hook and off-hook) are transmitted to the signaling circuit of the trunk by the Transmitting Signaling Circuit 212.

The N Ferrod 203 of the trunk circuit is employed to check the continuity of a path (service task result) through the network between two trunk circuits. As seen in FIG. 2, the N Ferrod 203 of the right-hand trunk circuit serves to check the continuity of the transmission path from the left trunk circuit to the right trunk circuit. Similarly, the N Ferrod 203 of the left trunk circuit is employed to indicate the continuity of the transmission path from the right trunk circuit to the left trunk circuit. The N Ferrods 203 are arranged in ordered groups and may be interrogated by the Trunk Scanner 155 under a command from the Central Control 101. Associated with each N ferrod are two bits (N1, N2) in memory. The N1 bit is reserved for indicating the last ascertained state of the corresponding N Ferrod 203 and the N2 bit is a control bit which indicates whether or not information is to be accepted from the corresponding N ferrod.

As seen in FIG. 2, the E Ferrods 204 of each trunk circuit can similarly be interrogated by the Trunk Scanner 155 in accordance with commands from the Central Control 101. The trunk connected to a trunk circuit originates demands for service and indicates answers by closing the circuit between the two wires of the Receiving Signaling Circuit 213. There are also two bits (T1, T2) of memory associated with each E Ferrod 204. The T1 bit like the N1 bit is reserved for defining the last ascertained state of the corresponding E Ferrod 204 and the T2 bit similarly is a control bit which indicates whether or not information is to be accepted from the E Ferrod 204.

The trunk circuit is sequenced through its states by manipulation of the CT and M Control Relays 206 and 205. These relays are magnetically latching relays which respond to operate and release signals from the Signal Distributor 156 in accordance with commands from the Central Control 101.

The memory associated with the N and E ferrods comprise service task information which is located in the variable location © in the Call Store 103. In FIG. 7 these are referred to as trunk state bits.

CENTRAL PROCESSOR

The Central Processor 100, as seen in FIG. 1, comprises the Central Control 101, the Program Store 102, and the Call Store 103. The Central Control 101, shown below the dotted line in FIG. 3 and in FIGS. 4 and 5, performs system data processing functions in accordance with sequences of program order words. The program order words fall into two general classifications, namely, decision orders and non-decision orders.

Decision orders are generally employed to institute desired actions in response to present conditions with regard to trunks served by the switching system or present conditions with respect to the maintenance of the system.

Decision orders dictate that a decision shall be made in accordance with certain observed conditions and the result of the decision causes the Central Control 101 to advance to the next order of the current sequence of order words or to transfer to an order in another sequence of order words. Decision orders are also termed "conditional transfer orders."

Nondecision orders are employed to communicate with units external to Central Control 101 and to both move data from one location to another and to logically process the data in accordance with certain defined instructions. For example, data may be merged with other data by the logical functions of AND, OR, EXCLUSIVE-OR, product mask, et cetera, and also data may be complemented, shifted, and rotated.

Nondecision orders perform some data processing and/or communicating actions, and upon completion of such actions most nondecision orders cause the Central Control 101 to execute the next order in the sequence. A few nondecision orders are termed unconditional transfer orders and these dictate that a transfer shall be made from the current sequence of program orders to another sequence of order words without benefit of a decision.

The sequences of order words which are stored principally in the program store comprise ordered lists of both decision and nondecision orders which are intended to be executed serially in time. The processing of data within the central control is on a purely logical basis; however, ancillary to the logical operations, the Central Control 101 is arranged to perform certain minor arithmetic functions. The arithmetic functions are generally not concerned with the processing of data but, rather, are primarily employed in the process of fetching new data from the memories such as from the Program Store 102, the Call Store 103, or particular flip-flop registers within the Central Control 101.

The Central Control 101, in response to the order word sequence, processes data and generates and transmits signals for the control of other system units. The control signals which are called commands are selectively transmitted to the Program Store 102, the Call Store 103, and to the Input-Output.

The Central Control 101 is, as its name implies, a centralized unit for controlling all of the other units of the system. A Central Control 101 principally comprises:

(A) A plurality of multistage flip-flop registers, such as XR, YR, ZR, JR and K reg.;

(B) A plurality of decoding circuits, such as OWD, BOWD and MXD;

(C) A plurality of private bus systems for communicating between various elements of the central control, such as the masked bus MB and the unmasked bus UB;

(D) A plurality of receiving circuits for accepting input information from a plurality of sources, such as gates 301, 302, 308;

(E) A plurality of transmitting circuits for transmitting commands and other control signals, such as gates 300, 303, 502, 503 and the command translator;

(F) A plurality of sequence circuits, such as SEQ1–SEQN;

(G) Clock sources, such as CLK; and (H) A plurality of gating circuits (order combining gates) for combining timing pulses with D-C conditions derived within the system.

The operation of these elements is further described in the above-mentioned Doblmaier et al. application.

The Central Control 101 is a synchronous system in the sense that the functions within the Central Control 101 are under the control of a multiphase Microsecond Clock 4CLK–CLK which provides timing signals for performing all of the logical functions within the system. The timing signals which are derived from the Clock 4CLK–CLK are combined with D-C signals from a number of sources in the order combining gate circuit. The details of the order combining gate circuit are not shown in the drawing as the mass of this detail would merely tend to obscure the inventive concepts of this system.

Sequence of central control operations

All of the system functions are accomplished by execution of the sequences of orders which are obtained from the Program Store 102 or the Call Store 103. Each order of a sequence directs Central Control 101 to perform one operation step. An operational step may include several logical operatoins as set forth above, a decision where specified, and the generation and transmission of commands to other system units.

The Central Control 101 at the times specified by phases of the Mirosecond Clock 6100 performs the operational step actions specified by an order. Some of these operational step actions occur simultaneously within Central Control 101, while other are performed in sequence. The basic machine cycle, which in this one illustrative embodiment is 5.5 microseconds, is divided into three major phases of approximately equal duration. For purposes of controlling sequential actions within a basic phase of the machine cycle each phase is further divided into one-half microsecond periods which are initiated at one-quarter microsecond intervals.

The basic machine cycle for purposes of designating time is divided into one-quarter microsecond intervals, and the beginning instants of these intervals are labeled T0 through T22. The major phases are labeled phase 1, phase 2, and phase 3. These phases occur in a 5.5 microsecond machine cycle as follows:

(A) Phase 1—T0 to T8,
(B) Phase 2—T10 to T16,
(C) Phase 3—T16 to T22.

For convenience in both the following description and in the drawing, periods of time are designated $bTe$ where $b$ is the number assigned the instant at which a period of time begins and $e$ the number assigned the instant at which a period of time is ended. For example, the statement 10T16 defines phase 2 which begins at time 10 and ends at time 16.

The clock 6100, 6101 comprises a microsecond clock 6100 and a millisecond clock 6101. The Microsecond Clock 6100 generates output signals which are transmitted to the Order Combining Gate 3901. Further, the Microsecond Clock 6100 provides input signals to the Millisecond Clock 6101. These input signals occur once every 5.5 microseconds.

The Millisecond Clock 6101 comprises 12 binary counter stages along with counter recycling circuitry. The 12 stages are arranged as a series of recycling counters, the output of each counter providing an input to the next succeeding counter. Stages 1 through 4 provide a count of 13 and thus, with 5.5 microsecond input signals, provide an output signal once every 71.5 microseconds. Stages 5 through 7 provide a count of 7 and thus, with an input once every 71.5 microseconds, provide an output once every 500.5 microseconds (once per half millisecond). Stage 8 provides a count of 2 and thus, with a half millisecond input interval, provides an output pulse once every millisecond. Stages 9, 10, and 11 provide a count of 5 and, with input pulses once per millisecond, provide output pulses once every 5 milliseconds. Stage 12 provides a count of 2 and thus, with input pulses once every 5 milliseconds, provides an output pulse once every 10 milliseconds.

The output conductors of the "1" side of each counter stage of the Millisecond Clock 6101 are connected to the Order Combining Gate Circuit 3901.

In order to maximize the data processing capacity of Central Control 101 three cycle overlap operation is employed. In this mode of operation central control simultaneously performs:

(A) The operational step for one instruction;
(B) Receives from the Program Store 102 the order for the next operational step; and
(C) Sends an address to the Program Store 102 for the next succeeding order.

Three cycle overlap operation is made possible by the provision of both a Buffer Order Word Register 2410, an Order Word Register 3403 and their respective decoders, the Buffer Order Word Decoder 3902 and the Order Word Decoder 3904. A Mixed Decoder 3903 resolves conflicts between the program words in the Order Word Register and the Buffer Order Word Register 2410. The Auxiliary Buffer Order Word Register 1901 absorbs differences in time of program store response.

The initial gating action signals for a first order X (herein designated the indexing cycle) are derived in the Buffer Order Word Decoder 3902 in response to the appearance of order X in the Buffer Order Word Register 2410. The order X is gated to the Order Word Register 3403 (while still being retained in the Buffer Order Word Register 2410 for the indexing cycle) during phase 3 of cycle 2; upon reaching the Order Word Register 3403 the final gating actions (herein indicated as the execution cycle) for the order X are controlled via Order Word Decoder 3904.

The indexing cycle and the execution cycle are each less than a 5.5 microsecond machine cycle in duration. In the executing of the operational steps of a sequence of single cycle orders each order remains in the Order Word Register 3403 and the Buffer Order Word Register 2410 for one 5.5 microsecond cycle. The Buffer Order Word Decoder 3902 and the Order Word Decoder 3904 are D-C combinational circuits; the D-C output signals of the decoders are combined with selected microsecond clock pulses in the Order Combining Gate Circuit 3901. This Order Combining Gate Circuit 3901 thus generates the proper sequences of gating signals to carry out the indexing cycle and the execution cycle of each of the sequence of orders in turn as they appear first in the Buffer Order Word Register 2410 and then in the Order Word Register 3403.

The performance of the operational steps for certain orders requires more time than one operational step period, i.e., more than 5.5 microseconds. This requirement for additional time may be specified directly by the order; however, in other instances this requirement for additional time is imposed by indicated trouble conditions which occur during the execution of an order. Where an order specifies that the execution thereof will require more than one operational step period, the additional processing time for that order may be gained by:

(1) Performing the additional data processing during and immediately following the indexing cycle of the order and before the execution cycle of the order; or (2) Performing the additional data processing during and immediately after the normal execution cycle of the order.

The performance of these additional work functions is accomplished by way of a plurality of sequence circuits within Central Control 101. These sequence circuits are hardware configurations which are activated by associated program orders or trouble indications and which serve to extend the time in the operational step beyond the normal operational step period. The period of time by which the normal operational step period is extended varies depending upon the amount of additional time required and is not necessarily an integral number of machine cycles. However, the sequences circuits which cause delays in the execution of other orders always cause delays which are an integral number of machine cycles.

The sequence circuits share control of data processing within the Central Control 101 with the decoders, i.e., the Buffer Order Word Decoder 3902, the Order Word Decoder 3904, and the Mixed Decoder 3903. In the case of orders in which the additional work functions are performed before the beginning of the execution cycle, the sequence circuit or, as more commonly referred to, the "sequencer" controls the Central Control 101 to the exclusion of decoders 3902, 3903, and 3904. However, in the case of orders in which the additional work functions are performed during and immediately after the execution of cycle of the order, the sequencer and the decoders jointly and simultaneously share control of the Central Control 101. In this latter case there are a number of limitations placed on the orders which follow an order which requires the enablement of a sequencer. Such limitations assure that the central control elements which are under the control of the sequencer are not simultaneously under the control of the program order words.

Each sequence circuit contains a counter circuit, the states of which define the gating actions to be performed by the sequence circuit. The activation of a sequence circuit consists of starting its counter. The output signals of the counter stages are combined with other information signals appearing within Central Control 101 and with selected clock pulses in the Order Combining Gate Circuit 3901 to generate gating signals. These signals carry out the required sequence circuit gating actions and cause the counter circuit to advance through its sequence of internal states.

Sequence circuits which extend the period of an operational step by seizing control of a Central Control 101 to the exclusion of the decoders 3902, 3903, and 3904 are arranged to transmit the address of the next succeeding program order word concurrently with the completion of the sequencer gating actions. Thus, although the execution of the order immediately succeeding an order which enabled the sequencer of the above character is delayed, overlap is maintained.

Sequence circuits which do not exclude the decoders BOWD, OWD, and MXD provide additional overlap. That is, the transmission of the address of and acceptance of the order immediately succeeding an order, which enabled a sequencer, are not delayed. The additional gating actions require by such sequence circuits are carried out not only concurrently with the indexing cycle of the immediately succeeding order, but also concurrently with at least a portion of the execution cycle of the immediately succeeding order.

A few examples will serve to illustrate the utility of the sequence circuits. A program order which is employed to read data from the Program Store 102 requires an additional two 5.5 microsecond machine cycle periods for completion. This type of order gains the additional two cycles by delaying the acceptance of the immediately succeeding order and performs the additional work operations after termination of the indexing cycle of the current order and before the execution cycle of the current order.

When errors occur in the reading of words from the Program Store 102, the Program Store Correct-Reread Sequencer is enabled to effect a correction or a rereading of the Program Store 102 at the previously addressed location. This sequence circuit is representative of the type of sequence circuit which is enabled by a trouble indication and which seizes control of the Central Control 101 to the exclusion of the decoders.

The Command Order Sequencer 4902 which serves to transmit network commands to the Switching Network 120 and to the miscellaneous network units, i.e., Master Scanner 144, AMA Tape Unit 147, and Card Writer 146, is representative of the sequence circuits which, when enabled, increase the degree of overlap. That is, the transmission of network commands extends into the execution cycle of the order following the network command order.

In the processing of certain multicycle orders a plurality of sequence circuits may be activated so that the processing of the multicycle order may include both kinds of gating actions; first additional gating cycles may be inserted between the indexing cycle and the execution cycle of the order, and then a second sequence circuit may be activated to carry out gating actions which extend the degree of overlap to an additional cycle or cycles.

Central control responses to program order words

FIGS. 3–5 aid in understanding the basic operational step actions that are performed by Central Control 101 in response to various program order words. Each program order word comprises an operational field, a data-address field, and Hamming error detecting and correcting bits.

The operation field is a fourteen or a sixteen bit binary word which defines the order and specifies the operational step actions to be performed by the Central Control 101 in response to the order. The operation field is fourteen or sixteen bits long, depending on the particular order which is defined by the operation field.

There are sets of "options" that may be specified with each of the program order words. The operational step of each order consists of a specific set of gating actions to process data contained in Central Control 101 and/or communicate information between the Central Control 101 and other units in our system. When an option is specified with the program order being executed, additional data processing is included in the operational step. A portion of the fourteen or sixteen bit operation field of a program order word specifies the program order, and the remaining portion of the field may select one or more of the options to be executed.

Certain of the options are compatible with and provide additional data processing for nearly all of the orders. An example of such an option is that of "indexing" in which none or one of seven flip-flop registers within Central Control 101 are selected for additional data processing. In the orders which permit indexing a three bit portion of the operation field is reserved as the indexing field to indicate the choice of none or the one of seven registers to be employed.

Other options are limited to those orders for which the associated gating actions do not conflict with other portions of the operational step and are also excluded from those orders to which the options do not provide useful additions. Accordingly, portions of the operation field are reserved for those options only where applicable. That is, Central Control 101 is responsive to such options only if the program order word being executed is one to which the options are applicable. If an option is not applicable, then that portion of the operation field instead serves in the specification of other program orders or options. The assignment of the binary codes in portions of the operation field to options is therefore selectively conditioned upon the accompanying program order if the option is to have limited availability.

The data-address field of a program order word is either a twenty-three bit data word to be placed in a selected flip-flop register in Central Control 101 or a twenty-one bit word which may be used directly or with indexing to form a code-address for addressing memory. In all order words the sum of the bits of the operation field (sixteen or fourteen) plus the bits of the data-address field twenty-one or twenty-three is always thirty-seven bits. If the order word has a sixteen bit operation field, its data-address field will be twenty-one bits long; if the operation field is fourteen bits long, the data-address is a twenty-three bit number. The shortened D-A field is utilized to obtain more combinations in the correspondingly lengthened operation field and therefore a larger and more powerful collection of program order words.

The Central Control 101 performs the operational steps for most orders at the rate of one order per 5.5 microsecond cycle. Although such orders are designated single cycle orders, the total time involved in obtaining the order word and the central control responses thereto is in the order of three 5.5 microsecond cycles. The overlap operation previously noted herein permits Central Control 101 to achieve the stated rate of performing one such single cycle order every 5.5 microseconds.

General purpose logical processing circuit 2000 (FIG. 3 and FIGS. 10 and 11)

The main path for moving data between the principal data sources of the processor and the destination registers includes the general purpose logical processing circuit 2000. The general connections to the circuit 2000 are shown in FIG. 3 and the corresponding details of these connections are shown in FIGS. 10 and 11.

For the purposes of this discussion, the program orders may be divided into three groups, namely: (a) W orders; (b) memory reading orders; and (c) memory writing orders. Within each of these groups of orders there are particular orders which utilize the facilities of the general purpose logical processing circuit 2000. As previously explained, a program order word may directly specify either one or both of the operands to be processed in the circuit 2000. In the illustrative embodiment, the specification of one or both of the operands by the order is termed an option; however, other orders inherently define both operands. Orders which permit PL and PS masking are examples of orders in which the specification of one or both operands is optional. For example, the orders WF, WJ, WX, etc., have provision for both PL and PS masking. As previously indicated herein, an order word includes an operational field, a data-address field, and error detecting and correcting bits. A portion of the operational field is devoted to specifying the use of options. That is, the operational field of the orders such as WF, WJ, WX, etc., includes a particular portion which is devoted to the specification of the PL and PS options. The PL and PS options are both termed product masking options since the two operands which are processed in accordance with these instructions result in the product (logical AND) of the two operands.

Orders which inherently define both of the operands may specify product masking (AND), union masking (OR), or exclusively OR masking (EXCLUSIVE OR). For example, the orders PWX, PWY, and PWZ are product masking orders that inherently define both operands. Similarly, the orders UWX, UWY, and UWZ are union masking orders that inherently specify both operands. Similarly, the order words PMX, PMY, PMZ, and the orders UMX, UMY, and UMZ are product masking and union masking order words in the group of order words termed memory reading orders. These orders directly specify both operands.

For purposes of illustration only, three main sources of data are described. These are namely the contents of the index adder output register 3401 of the index adder complex of FIG. 4; the contents of any selected one of the plurality of flip-flop registers 2501, 3001, 3002, 4001, 5801, 5802 within the processor; and the contents of the data buffer register 2601.

The group of orders, which are termed W orders, employ the contents of the index adder output register 3401 of the index adder complex of FIG. 4 as the second operand. In these orders the mnemonic W specifies the "word" which is generated in the index adder complex of FIG. 4. The index adder complex includes an index adder addend register 2904, an index adder augend register 2908, and index adder 3407 which is arranged to arithmetically combine the contents of the addend and augend registers, and an index adder output register 3401.

The data-address field of an order word may be selectively gated to the index adder addend register 2904 or to the logic register 2508. The contents of one of the several index registers 2501, 3001, 3002, 4001, 5801, 5802, may be selectively gated to the index adder augend register 2908. Some of the W orders specify that the contents of the addend or augend registers will have the value "0" and in these orders the word appearing at the output of the index adder output register will be the contents of the augend register 2908 or the contents of the addend register 2904, respectively. An example of an order in which the contents of the addend register 2904 will be "0" is the order WX with the PS option specified. This order provides for transmitting the data-address field of the order to the logic register 2508 from the buffer order word register 2410 via conductor group 2409. The data-address field of the order WX, in this instance, is the first operand for the general purpose logical processing circuit 2000.

The second operand of order WX, like all W group orders, it is the contents of the index adder output register 3401. These contents are transmitted to the general purpose logical processing circuit 2000 via the conductor group 3402. As seen in FIG. 10, the data word appearing on conductor 3402 may be selectively gated to the circuit 2000 by enabling AND gate 2001. The enabling signal IRMB for the gate 2001 is one of the signals appearing on the order cable 3900 when the order WX is executed.

As previously indicated, the order WX with PS masking specified results in combining the two operands (i.e., the contents of the logic register 2508 and the contents of the index adder register 3401) by product masking (logic AND). As seen in FIGS. 3 and 10, the first operand is transmitted to the AND OR circuit 2005 via the conductor group 2509. The output of the AND gates 2001 is transmitted via OR gate 2004 to the second input of the AND OR circuit 2005, and as specified by the order WX the order cable conductor P Mask is enabled. The resulting output word of the AND OR circuit 2005 is the logical AND of the two operands and this word may be gated directly to the specified destination register (X register 2501). Alternatively, the resulting word may be complemented in the complement circuit 2006 and the complement word gated to the specified destination register (X register 2501). If the output of the AND OR circuit 2005 is to be complemented, the option field portion of the order word will so indicate and the order cable conductor COMP-M of FIG. 10 will be enabled. However, if the word is not to be complemented, the option portion of the operational field will so indicate and the order cable conductor MPASS will be enabled and the output of the AND OR circuit 2005 will be transmitted via AND gate group 2013, the OR gate 2009, and the bus circuit 2011 to the AND gate 2500. As indicated by the mnemonics of the order WX, the decoding of this order word will provide for enabling the order cable conductor MBXR to enable the AND gate 2500 to transfer the word to the X register 2501.

If the PL option is specified in the order WX, the contents of the logic register 2508, as established by a previously executed order word, comprises the first operand. As previously described, the second operand comprises the contents of the index adder output register 3401.

The orders PWX and UWX serve to illustrate the W class orders which inherently define both operands to be processed in the general purpose logical processing circuit 2000. The order PWX, for example, specifies that the contents of the X register 2501 are to be moved to the logic register 2508 to establish the first operand, the contents of the index output register 3401 comprise the second operand; the two operands are to be product masked (form a word which is the logical AND of the two operands); and the resulting word is moved to the X register 2501 via the bus 2011 and the AND gate 2500. The order UWX specifies the same operands, however, the resulting word is the logical OR of the two operands. As was explained with respect to the order WX, the word which is formed at the output terminals output circuit 2005 may be gated directly to the OR gate 2009, or, a complement of that word may be formed in the complement circuit 2006, the output of which is then gated to the OR gate 2009.

In summary, for each of the W class orders the contents of the index adder output register 3401 comprises the second operand for the general purpose logical processing circuit 2000, while the first operand may be selected from one of the several flip-flop registers, from the data-address field of the order, or, the first operand may have been previously established by a priorly executed order word.

Memory reading orders comprise the second group of orders. In these orders information read from memory at an address specified by the order comprises the second operand. The first operand may be derived from the same sources set forth with respect to W class orders. The order PMX serves to illustrate this class of order. The order PMX indicates that the contents of the X register are to be transmitted to the logic register 2508 to establish the first operand, the memory is to be read at an address specified by the data-address field of the order, the data read from the memory is to be gated from the buffer register 2601 via conductor group 2015 and AND gate 2002 to the input of the general purpose logical processing circuit 2000; and the two defined operands are to be joined by product masking to form the logical AND of the two operands. The resulting word is transmitted to the X register 2501.

The memory reading order UMX follows the same pattern established for the order PMX. However, the two operands are joined by union masking rather than by product masking.

The order KMKX5 provides for forming a word which is the EXCLUSIVE-OR of the two operands. In accordance with this order, the first operand is the contents of the logic register 2408, set by a previous order, and the second operand is the information which is read from the memory 103 at an address location defined by the data-address portion of the order word. As seen in FIG. 10, there is no provision for complementing the word which occurs at the output of the EXCLUSIVE-OR circuit 2008. The EXCLUSIVE-OR circuit is enabled by a signal on the order cable conductor XMASK.

The third class of orders are memory writing orders. The memory writing orders, which utilize the general purpose logical processing circuit 2000 to combine two operands, all are of the class which defines the first operand as an option of the other word. That is, the first operand for each of these orders (e.g., LM, FM, JM, KM, XM, etc.) is the contents of the logic register 2508, as established by a previously executed order word, or, the data-address portion of the order. The second operand is specified by the order word. For example, the order XM specifies that the contents of the X register 2501 comprise the second operand.

In summary, the general purpose processing circuit 2000 provides a convenient means of processing data as it is moved from any one of the principal data sources within the processor to one of the destination registers. In the illustrative embodiment both operands may be selected from a number of data sources and there is provision for performing one logical operation as data is moved from one location to another. Additionally, after certain logical operations, the resulting word may be complemented. The circuit 2000 also permits data in transit to be transmitted directly to a distination register without alteration or, alternatively, the data being transferred may be complemented and the complement word transmitted to the destination register.

K Register 4001 (XR); K Logic; Detect First-One Circuit 5415

The K Register 4001, the K Logic, and the Detect First-One Circuit 5415 provide a second major internal data processing facility. The K Logic comprises input and output circuitry surrounding the K Register 4001. The K Logic includes the K A Input Register 3502, the K B Input Register 3504, the K Input Logic 3505, the K Logic Homogeneity Circuit 4502; and at the output of the K Register 4001 the Rotate Shift Circuit 4500 and the K Register Homogeneity Circuit 4503. The K Input Logic 3505 may be directed by output signals of the Order Combining Gate 3901 to perform one of four logical operations on two operands. One operand is the content of the K Register 4001; the other is the information on the Masked Bus 2011. The Order Word Decoder 3904 and the K Register Sequence Circuit (one of the Sequencing Circuits SEQ1–SEQN) generate signals which cause the K Input Logic 3505 to combine the two operands in the operations of AND, OR, EXCLUSIVE-OR, or ADDITION. The word resulting from the logical combination, according to the order in the Order Word Register 3403, may either be gated to the K Register 4001 or to the Control Homogeneity Circuit 5000 and the Control Sign Circuit 5413.

A word appearing on the Masked Bus 2011 may in some instances be gated directly to the K Register 4001 via the K Input Logic 3505. The K Register 4001 may thereby be employed as a simple destination register for data like other flip-flop registers in central control such as XR, YR, ZR, et cetera.

In carrying out the ADDITION operation in the K Input Logic 3505 the two operands are treated as twenty-two bit signed numbers. The twenty-third bit of each operand is the sign bit. If this bit has the value "0" the number is positive, and the magnitude of the number is given by the remaining twenty-two bits. If the sign bit is "1" the number is negative, and the magnitude of the number is given by the one's complement of the remaining twenty-two bits. (The magnitude is determined by inverting each bit of the twenty-two bit number.) The add circuit within K Input Logic 3505 can correctly add any combination of positive and negative operands as long as the magnitude of the algebraic sum of the two operands is equal to or less than $2^{22} - 1$.

The K Logic and the K Register 4001 can perform other logical operations on the contents of the K Register 4001. One of these operations is given the name "SHIFT." The gating action performed by SHIFT is based, in part, on the least significant six bits of the number that appears in the Index Adder Output Register 3401 at the time the shift is to be performed. The least significant five bits constitute a number that indicates the magnitude of the of the shift, and the sixth bit determines the direction of the shift. A "0" in the sixth bit is interpreted as a shift to the left, and the remaining five bits indicate the magnitude of this shift. A "1" in the sixth bit is interpreted as a shift to the right, and the one's complement of the remaining five bits indicates the magnitude of the shift to the right. Although in shifts to the right the least significant five bits contain the one's complement of the magnitude of the shift, the six bit number will be referred to hereafter as comprising a sign and a magnitude.

A shift of one to the left results in the contents of each flip-flop in the K Register 4001 being gated to the adjacent flip-flop to the left. (The most significant bit of the K Register 4001, bit 22, is on the extreme left; and the least significant bit, bit 0, is on the extreme right.) A "0" replaces the contents of the least significant bit position of the K Register 4001 (there is no flip-flop to the right of the "0" position flip-flop) and the most significant bit is shifted out of the register. That is, the bit 22 flip-flop has no flip-flop to its left and the information is not retained.

A shift of two to the left is equivalent to two successive shifts of one to the left, a shift of three to the left is equivalent to three successive shifts of one to the left, et cetera. A shift of twenty-three to the left causes all zeros to be placed in the K Register 4001. A shift of one to the right results in the contents of each flip-flop in the K Register 4001 being gated to the adjacent flip-flop to the right. A "0" replaces the contents of the most significant bit of the K Register 4001, and the original least significant bit of the K Register 4001 is thus not retained.

A shift of two to the right is equivalent to two successive shifts of one to the right, a shift of three to the right is equivalent to three successive shifts of one to the right, a shift of twenty-three to the right results in the contents of the K Register 4001 being made all zeros.

A logical operation similar to the shift is the operation "ROTATE." As in shifting, the six bits of the Index Adder 3401 are treated as a direction and magnitude for the rotation just as described for the shift.

A rotate of one to the left is identical to a shift of one to the left except for the gating of the flip-flops at each end of the K Register 4001. In a rotation of one to the left the content of bit twenty-two is not lost as in the shift but instead replaces the content of the least significant zero bit of the K Register. A rotate of two to the left is identical to two rotates of one to the left in succession, a rotate of three to the left is identical to three rotates of one to the left, et cetera. A rotate of twenty-three to the left has the same effect on the K Register 4001 as no rotation. A rotation to the right bears a similar relation to a shift to the right.

In summary, the gating action of rotation is identical to that of shift except that the register is arranged in a circular fashion wherein the most significant bit is treated as being to the right of the least significant bit of the K Register 4001.

A complement option may be employed with shift and rotate orders and, where specified, the significance of the sign bit is inverted, that is, where the complement option is specified a "0" in the sixth bit is interpreted as a shift to the right while a "1" in the sixth bit is interpreted as a shift to the left.

A special purpose rotate order applies rotation to only bits 6 through 21 of the K Register 4001 and leaves the remaining positions of the K Register 4001 unchanged.

Another logical gating action is the determination of the rightmost one in the contents of the K Register 4001. This action is accomplished by gating the contents of the Detect First-One Circuit 5415 to the F Register 5801 via the Unmasked Bus 2014, the Mask and Complement Circuit 2000 and the Masked Bus 2011. The number gated is a five bit binary number corresponding to the first stage (reading from the right) in the K Register 4001 which contains a "1." If the least significant bit of the K Register 4001 contains a "1," zero is the number gated to the F Register 5801. If the first "1" reading from the right is in the next position, one is the number gated to the F Register 5801. If the only "1" appearing in the K Register 4001 is in the most significant position, twenty-two is the number gated to the F Register 5801. If the K Register 4001 contains no "1's," then nothing is gated to the F Register 5801.

Index adder arrangement

A third major data processing configuration within the Central Control 101 is the Index Adder 2904, 2908, 3407, 3401 which is used to:

(1) Form a quantity designated herein as the indexed DAR word consisting of the sum of the D-A field of the program order word being executed and the contents of an index register specified in an order, or (2) To perform the task of a general purpose adder; the operands in this latter instance may be the contents of two index registers or the D-A field and the contents of an index register.

The Index Adder arrangement comprises an addend register 2904, an augend register 2908, a parallel adder 3407 and an Index Adder Output Register 3401. The output signals of the Index Adder arrangement are selectively connected to the Program Address Register, the Memory Address Decoder 3905 and the Call Store Address Bus System 6401 when employed for indexing; the outputs of the adder may also be connected to the Masked Bus 2011 via the Mask and Complement Circuit 2000 when employed as a general purpose adder. Access to the Masked Bus 2011 permits the word formed to be employed for a number of purposes, for example:

(1) Data to be placed in the K Register 4001 without modification or to be combined with the contents of the K Register 4001 in the K Input Logic 3505;

(2) A number for determining the magnitude and direction of a shift or rotate;

(3) Data to be placed in a specified index register;

(4) Data to be transmitted over the Network Command Bus 104 via the KA Input Register 3502 and the Command Translator 3509;

(5) Data to be sent to the Central Pulse Distributor via the F Register 5801 and the Central Pulse Distributor Translator 5422.

Indexing is the adding of two numbers in the Index Adder 3407. The D-A field of the order as it appears in the Buffer Order Word Register 2410 is one operand used in indexing and the other operand, if required, is the contents of one of the seven Index Registers BR, FR, JR, KR, XR, YR, and ZR. For orders which include the indexing option a three bit number within the operation field specifies either (1) no indexing, or (2) indexing on one of the seven flip-flop registers according to the following table.

| X34 | X33 | X32 | Register |
|---|---|---|---|
| 0 | 0 | 0 | No register. |
| 0 | 0 | 1 | BR |
| 0 | 1 | 0 | FR |
| 0 | 1 | 1 | JR |
| 1 | 0 | 0 | KR |
| 1 | 0 | 1 | XR |
| 1 | 1 | 0 | YR |
| 1 | 1 | 1 | ZR |

If no register is specified for indexing, then only the D-A field is gated to the Index Adder arrangement and the output of the Index Adder arrangement will be the D-A field (the sum of the D-A field and zero). If an index register is specified, the contents thereof are normally gated onto the Unmasked Bus 2014 and from there directly into the Index Adder arrangement.

A number of the orders have as an option specified by a combination of bits in the operation field the loading of the D-A field into the Logic Register 2508. This option permits the placing of specified new data into the Logic Register 2508 for use in subsequent masking operations. If the D-A field is used to load the Logic Register 2508, then it is considered not available for indexing and the only operand gated to the Index Adder arrangement is the contents of a specified index register.

The sum appearing at the output of the Index Adder arrangement is referred to as the DAR address or word. If indexing is not specified in an order, the DAR address or word is the D-A field of that order. If indexing is specified and the D-A field is not gated to the Logic Register 2508, the DAR address or word will be the sum of the D-A field and the contents of the specified index register. If the D-A field is used for loading the Logic Register 2508, the DAR will be the contents of the specified index register.

The Index Adder arrangement 2904, 2908, 3407, 3401, as well as the add circuit within the K Input Logic 3505, utilizes one's complement binary arithmetic. All inputs of the index adder 3407 are treated as twenty-two bit numbers with the twenty-third bit a sign bit. A positive number is indicated by a "0" in the twenty-third bit and a negative number by a "1" in the twenty-third bit. End-around-carry is provided so that the Index Adder arrangement can correctly handle all four combinations of positive and negative operands as long as the algebraic sum of the two operands does not exceed $2^{22} - 1$.

Some orders, as previously mentioned, have a twenty-three bit D-A field, and others have a twenty-one bit D-A field. If the D-A field is only twenty-one bits long, then the twenty-first bit is treated as the sign bit; this bit is expanded to also become the twenty-second and twenty-third bits of the effective D-A field gated to the Index Adder arrangement. Expansion converts a twenty-one bit D-A field to an effective twenty-three bit D-A field for indexing. Expansion preserves the end-around-carry for indexing with twenty-one bit D-A fields.

Decision Logic 3906

The Central Control 101 in the execution of a decision order in a sequence of orders either continues with the current sequence of orders or transfers to a new sequence of orders. The decision is made by the Decision Logic 3906 in accordance with the order being processed. The order specifies the information to be examined and the basis for the decision. The information may be obtained from the Control Homogeneity Flip-Flop 5020, the Control Sign Flip-Flop 5413 or selected outputs of the K Logic. The basis of the decision may be that the information examined is (or is not) arithmetic zero, less than zero, greater than zero, et cetera. A decision to advance does not disturb the current sequence of obtaining and executing orders. A decision to transfer to a new sequence of orders is coupled in accordance with the particular word being executed to a determination of whether the transfer is an "early transfer" or a "late transfer." Accordingly, if the decision is made to transfer, either the early transfer conductor ETR or the late transfer conductor LTR of the Cable 3911 will be energized and thereby activate the Transfer Sequencer 4401. Transfer signals from these conductors lead to the gating of the transfer address to the Program Address Register 4801. This causes the next program order word to be obtained from a new sequence of order words. The transfer address may be obtained from a number of sources and the source is indicated by the order being executed. In the case of "early transfer orders, the transfer address comprises the contents of a preselected one of the J Register 5802 or the Z Register 3002. In the case of "late transfer" order the transfer address may be obtained directly, in which case the DAR code-address which is formed in the index adder is employed, or indirectly, in which case the transfer address comprises a memory reading at the location specified by the DAR code-address which is formed in the Index Adder arrangement. This latter case is referred to herein as indirect addressing.

The distinction between "early transfer" and "late transfer" orders is based on whether or not the decision order requires a memory reading or writing in the event of an advance. A decision order which requires a memory to be read or written into after a decision to advance is an "early transfer" order. If the decision on such an early transfer order is to advance, then the memory reading or writing operation is carried out as a normal gating action under control of the Buffer Order Word Decoder 3902 and the Order Word Decoder 3904. However, if the decision is to transfer, the decision is advantageously made "early" to inhibit the gating associated with the memory reading or writing operation.

Other transfer orders which do not require a memory reading operation but which do require extensive data processing prior to making the decision are termed "late transfer" orders. These orders cannot employ the early transfer timing sequence in that the data processing operations required thereby are not necessarily completed by the time the early transfer signal would be generated.

Two input information sources for the decision logic comprise the output signals of the control homogeneity flip-flop 5020 and the control sign flip-flop 5413 which are employed to register homogeneity and sign information which is obtained from a number of locations. For example, a twenty-three bit data word appearing on the Masked Bus 2011 may be transmitted to the Control Homogeneity Circuit 5000. If the data word comprises either all "0's" or all "1's," the Control Homogeneity Flip-Flop 5020 will be set to its "1" state, otherwise the flip-flop will be reset. The Control Sign Flip-Flop 5413 serves to retain the sign of the data word; the Control Sign Flip-Flop 5413 is set if the word is negative and is reset if the word is positive.

The Control Homogeneity Circuit 5000 and the Control Sign arrangement are utilized by some decision orders by gating the output of a selected index register onto the Unmasked Bus 2014, through the Mask and Complement Circuit 2000 onto the Masked Bus 2011 and from there into the Control Homogeneity Circuit 5000 and the Control Sign Flip-Flop 5020. The contents of one of the seven index registers specified in the decision order being processed are thereby summarized in the Control Homogeneity Flip-Flop 5020 and Control Sign Flip-Flop 5413. Further gating actions associated with a decision order carry out the transfer or advance according to the output of the Decision Logic 3906.

Similar homogeneity and sign circuits provide facilities for a class of decision orders which transfer or advance according to combinations of the homogeneity and sign of twenty-three bit words contained in the K Register 4001.

ORGANIZATION OF INFORMATION IN THE MEMORY SYSTEM

FIG. 6 shows the organization of information in the Program Store 102 in seven locations labeled ① through ⑦. In the figure the arrangement of information and the size of the blocks representing the seven locations are not indicative of the absolute locations and sizes of the various blocks but, rather, are merely illustrative of the principles of this invention. The same is true of the three blocks labeled Ⓐ, Ⓑ, and Ⓒ in FIG. 7 which shows the arrangement of information in the Call Store 103.

Generic program—generic data

In FIG. 6 location ① contains the generic program and the generic data which is common to all offices of a particular class. The information in this area is always located at the same absolute addresses in the program store and the content is fixed for all offices of the same class. These assignments are made by the manufacturer and, generally, the information is placed in the memory by the manufacturer. The generic program comprises, with only minor exceptions, all of the program sequences required to implement both the call processing and maintenance functions of the class of office for which a program is prepared. The minor exceptions comprise the unique mutually exclusive programs, which are in location ② in the program store and which will be described later herein, and a few maintenance programs which are located in the call store and which are not further described herein.

The generic data comprises information for generating tables which are frequently used in the course of call processing. The generic program, in accordance with this data, is able to prepare the tables and store them in location Ⓐ in the call store. An example of the type of table which is generated and stored in the call store is a "diagonal table." The data word employed in the illustrative embodiment comprises 23 bits of information. The diagonal table comprises 23 words arranged sequentially in location Ⓐ of the Call Store 103. In the first word the rightmost bit position is a binary "1" and all other bit positions are binary "0". In word 2 the second bit position is a binary "1" and the first and other bit positions are binary "0." In the remaining words of the table the bit position corresponding to the word number is a binary "1" and all other bit positions are binary "0." Thus the name diagonal table obtains.

The generic program and the generic data are prepared by the manufacturer, and this information in the Program Store 102 is generally changed only if the growth of the office is such that the office becomes a member of a new generic class. Such a change is most unlikely since a single generic program covers both a wide range of traffic and a wide range of service features.

Mutually exclusive lengthy programs

There are certain program sequences which are quite lengthy and which are employed in an office on a mutually exclusive basis. For example, when an office is installed a particular concentration ratio is specified for the trunk link network. In one office a ratio of 2:1 may be employed while in other offices other ratios may be employed. A single ratio applies to the entire office. The program sequences which are dependent on office concentration ratio are examples of programs employed in the office on a mutually exclusive basis. Although it would be possible to place all of these mutually exclusive programs in the generic program location ①, such assignment of space would be wasteful. Accordingly, in the case of lengthy sequences which are employed in an office on a mutually exclusive basis the appropriate sequences which meet the requirements of the office at the time of installation are placed in location ② of the program store.

The information which uniquely defines an office is divided into two general categories, namely, parameters and translations. The unique mutually exclusive programs comprise the first element of the office parameters. Office translations will be described with respect to locations Ⓑ and Ⓒ of the Program Store 102.

Feature points

The generic program in location ① also includes many relatively short sequences of program order words which are employed on a mutually exclusive basis in each office of a class. Since these sequences are short, little space would be saved by selecting the appropriate sequences at the time of installation and compiling them in location ②. The choice of the selection of such sequences is accomplished by means of transfer instructions, termed "feature points," which are in location ③ in the program store. The call processing sequences include unconditional transfer instructions to absolute addresses in location ③. The program store at these absolute addresses contain other unconditional transfer instructions to appropriate absolute addresses in location ① of the program store. The transferred to address in location ① contains the first instruction of the sequence which applies to the particular office.

Equipment parameters

As previously stated, a single generic program serves offices having many distinguishing physical characteristics. The physical characteristics of interest to the following discussion are those which define the size of the office and the traffic handling capacity of the office. As employed herein the term "office size" relates to the number of lines and trunks served by the office and the term "traffic handling capacity" relates to the equipments which are provided to serve the lines and trunks. The following discussion does not include a description of features and services associated with the lines and trunks as this subject is subsequently covered herein under the general heading of "translations."

The information in locations ④ and ⑤ of the Program Store 102 are employed in initializing the information in locations Ⓑ and Ⓒ of the Call Store 103. There is not a one-to-one correspondence between the information in locations ④ and ⑤ and the information in locations Ⓑ and Ⓒ. The generic programs include program sequences termed the "initialization program sequences" and the "audit program sequences." These program sequences include instructions to read data in location ④ of the program store. As shown in FIG. 6, the information in location ④, like the information in locations ① through ③, is always at the same absolute address in the Program Store 102. The information in location ④ comprises pointers to data in location ⑤ of the program store. The data in location ⑤ is required by the initialization sequence to generate the information to be stored in locations Ⓑ and Ⓒ of the Call Store 103. The amount of data to be stored in location ⑤ varies from office to office; therefore, location ⑤ is not assigned the same fixed location in every office and the number of word locations assigned varies from office to office. The pointers in location ④ serve to locate the initialization data for the initialization and audit program sequences of the generic program.

The call processing sequences do not require access to the data in program store locations ④ and ⑤ since this data is only required to initialize the information in locations Ⓑ and Ⓒ of the Call Store 103. The call processing sequences have direct access to the information in location Ⓑ of the call store through instructions which are included in these sequences. The call processing sequences have access to the data in location ©  of the call store by means of the data obtained from location Ⓑ.

The data in location Ⓑ defines the equipment configuration employed in the office. It should be noted that there are basic equipment configurations of the central processor for a particular generic class of office and that the information in locations Ⓑ and © is not concerned directly with these basic configurations. In the Central Processor 100 of FIG. 1 the Central Control 101 always comprises two functionally equivalent central controls, the Program Store 102 always comprises at least two functionally equivalent program stores and the Call Store 103 always comprises at least two functionally equivalent call stores. The numbers of Program Stores 102 and Call Stores 103 are a function of office size and traffic handling capacity and the parameters in location Ⓑ reflect this fact. This will be understood from the following discussion.

The call processing sequences employ a large amount of bulk memory space in the Call Store 103 to record data which is accumulated during the course of serving a call and to maintain a record of the availability of equipments engaged by calls in process or by trouble conditions. A portion of the memory which is employed to record accumulated data is termed "a register" herein. There are, as explained below, several types of registers which are arranged in groups in location © in the Call Store 103. An originating register is an example of a register employed in accumulating data during the processing of a call. The general organization of an originating register in the Call Store 103 is shown in FIG. 13. Every office comprises a plurality of originating registers and there are two call store words which are common to all of the originating registers of the office. The two common words are termed the head cell word and the end cell word. The head cell word contains the address of the next originating register to be assigned and the end cell word contains the address of the last originating register to be assigned. Originating registers are assigned in the order of their release. That is, the originating register which has been idle the longest period of time is the first register to be assigned. The common head cell and end cell entries are shown in FIG. 13A. These entries are in location Ⓑ of the Call Store 103 and always appear at the same absolute addresses in memory in all offices of the same class.

In this one illustrative embodiment an originating register comprises a block of sixteen call store words arranged as shown in FIG. 13B. The first word of the register is the call state word. During the time that an originating register is engaged by a call the call may be in a number of states. For example, a connection may be established between the calling line and the call signaling receiver. Before the calling subscriber has transmitted the first dialed digit the call signaling receiver transmits dial tone to the calling subscriber. However, after the first digit has been received the dial tone is removed. These are two examples of call states which can be defined by the call state word in the originating register.

The second word of the originating register is the originating register link word. The originating registers are arranged in a linked list and the link word in each originating register indicates the address of the next originating register to be assigned. It is by this mechanism that originating registers are assigned in the order in which they are released. The linked list thus comprises a two word entry (head cell and end cell—FIG. 13) which is common to the linked list and linking entries which are individual to each of the articles which may be assigned (in this one case, originating registers). The two word entry is in location Ⓑ of the Call Store 103. In FIG. 7 item 1 in location Ⓑ is indicated to be the head and end cells for registers.

When the system is first initialized the head cell entry in location Ⓑ will identify the first originating register as the next to be assigned and the end cell entry will identify the last originating register to be the last to be assigned. The link word (word two) associated with the first originating register will show the second register to be the next to be assigned after the first has become engaged, et cetera, in numerical order through the remaining items to be assigned. After the system has started to process calls registers will be held for varying periods of time depending upon the speed with which the subscriber dials or pulses call signaling information and the relative speeds with which the central processor is able to establish calls and thus release registers. Accordingly, after the system has been in service a random linking of items to be assigned will exist. That is, no longer will the items be assigned in strict numerical sequence but, rather, the longest idle register will always be the next register which is seized to serve a call. This arrangement serves a very useful purpose in that all the registers are used even during very light periods of traffic. Therefore, any troubles which may occur in a register will be detected during normal operating periods and not only when a heavy traffic situation occurs.

Additionally, the use of a linked list permits a single pair of words (FIG. 12A), namely, head cell and end cell words, to suffice for every office of the class without dependence on the number of originating registers in the office. This arrangement facilitates office growth since the addition of one or more groups of registers merely requires the assignment of space within the call store location © and the inclusion of the new registers in the linked list. Accordingly, the information in the originating registers which were part of the system before the addition need not be disturbed and calls are not interrupted.

The originating registers comprise blocks of data in the Call Store 103. Each register comprises sixteen words which for purposes of programming economy occupy sixteen successive word locations in the memory. The word blocks of the many originating registers, however, may occur randomly in the memory since the link word give the address in memory of the next originating register.

The third word of each originating register is reserved for the address of a call signaling receiver register. Words 4 through 16 are reserved for accumulating call signaling information. As will be seen in the following description, call signaling information is detected by call signaling receivers, placed in call signaling receiver registers, and subsequently transferred to an associated originating register. Call signaling receivers are included in the service circuits which are located in the Trunk Frame 154 of FIG. 2, these terminate on the Trunk Link Networks 121, 122 and are arranged to be responsive to call signaling information received from a connected calling trunk. That is, when a trunk such as 160 through 163 initiates a call, the Central Processor 100 recognizes the request for service and establishes a connection through the Switching Network 120 to an idle call signaling receiver in the Trunk Frame 154. The call signaling receiver responds to call signaling information. The Central Processor 100 executes call processing program which sequences generate command signals which cause the Trunk Scanner 155 and the Master Scanner 144 to regularly examine information terminals (scan points) within the call signaling receiver, to obtain indications of the call signaling receivers responses to call signaling information from the connected originating trunk. The Central Processor 100 receives scanner responses over the Communication Path 208, interprets the scanner responses via a call signaling scanning program and records these responses in words of associated call signalling receiver registers in location Ⓑ.

Call signaling receivers are associated on a one-for-one basis with call signaling receiver registers which are shown schematically in FIGS. 12A, 12C, 12D, 12E, and 12F. A single linked list is adequate to show the availability of the call signaling receivers and their associated call signaling receiver registers. The head and end cells for this linked list are shown in FIG. 12A and like the head and end cell entries for the originating registers these two words are in location ⑬ of the Call Store 103. The linking words are shown in FIG. 12F with one linking word (AW4–1, AW4–2, etc.) for each call signaling receiver to be assigned.

The call signaling receiver registers comprise the three blocks shown in FIGS. 12C, 12D and 12E. The words in these three blocks are labeled Auxiliary Word 1, Auxiliary Word 2 and Auxiliary Word 3, respectively. In this arrangement the first auxiliary word (AW–1) contains the program store address of the generic program sequence which is required to perform the functions associated with the particular originating register. The second auxiliary word (AW–2) comprises nineteen bits. Bits 19–22 comprise a counter for registering the received digit and bits 0–18 comprise the address of an originating register which has become temporarily associated with a call signaling receiver register. That is, in the course of serving a request for service from a subscriber's line the Central Control 101 first assigns an originating register to the request and subsequently assigns a call signaling receiver and its associated call signaling receiver register to the request. This association of call signaling receiver register and originating register is noted in both the call signaling receiver register and in the originating register.

The third auxiliary word (AW–3) is reserved for the scanner address of Touch-Tone® numerical interrogation points of a Touch-Tone® call signaling receiver.

The originating registers are merely illustrative of many types of registers. For example, during the processing of a call the generic program employs ringing registers, disconnect registers, et cetera. The principles by which the generic program communicates with the various registers are identical to those set forth above in case of originating registers and call signaling receiver registers. In each instance a single pair of words (head cell word and end cell word) completes the necessary tie between the generic program and the above registers.

FIG. 14 shows the organization of service task information in the memory and the means of access to such information. The service task information is contained in a plurality of call registers (FIG. 14D) and a plurality of network terminal registers (FIG. 14E). The service task information is in the Call Store 103 at location © (FIG. 7). The size of this information area is variable from office to office; therefore, it is in the variable portion of the Call Store 103. Each Call Register comprises two 23-bit Call Store words which are in adjacent memory locations. The information in a Call Register defines:

(A) The activity state of the register (active or inactive)
(B) The state of the call (awaiting answer or talking)
(C) The originating terminal network number
(D) The terminating terminal network number
(E) The elements of the connection through the network between the originating and terminating terminals.

As seen in FIG. 14D, the register activity is determined by the state of bit 22 of the first call register word and the call state is indicated by the state of bit 21 of that word.

A 15-bit address fully defines a network terminal and for the originating terminal bits 0 through 14 of the first call register word define the network number. The remaining bits 15 through 20 of the first call register word define the junctor sub-group which is one of the elements required to define the connection through the network between the originating and terminating network terminals. The remaining information for defining the connection through the network is found in bits 11 through 22 of the second word of the call register.

Since a network terminal is identified by a 15-bit number, the eleven bits 0 through 10 of word 2 of the Call Register only partially define the location of the terminating terminal on the network. However, since the originating terminal network number and the junctor sub-group are both known from the contents of the first word, it is possible through a simple table look-up to derive the remaining four bits of the terminating terminal network number.

In summary, each call register contains information relevant to a single service task, and which fully defines the network terminals served by the task and the elements of the network employed in performing the task. Additionally, there is information in the Call Register which indicates whether the register is active or inactive and there is an indication as to whether the task is incomplete (awaiting answer) or completed (talking).

Additional service task information is found in the network terminal register which, in this one illustrative embodiment, is associated on a one-for-one basis with the network terminals. The network terminal registers contain two basic elements of information, namely a Call Progress Mark and the memory address of a Call Register when a service task is being performed with respect to that network terminal. As seen in FIG. 14E, a network terminal register comprises a single 23-bit call store word. Bits 0 through 17 define the memory address of a Call Register assigned to a service task being performed with respect to that terminal. The remaining five bits 18 through 22 in combination define the Call Progress Mark. In the illustrative embodiment there are four possible states of the Call Progress Mark, namely:

(1) Idle—(inactive stable);
(2) Served by call processing register (e.g., originating register, disconnect register, etc.)—(active unstable);
(3) Out of service—(inactive);
(4) Served by a call register (FIG. 14D) (active stable).

As seen from the information content of the network terminal register, the Call Progress Mark portion is updated as a service task performed with respect to that network terminal progresses. When the service task approaches an active stable state (i.e., when signaling of the trunk connected to the terminating terminal has commenced), a Call Register (FIG. 14) is assigned and the address of that Call Register is inserted in bit locations 0 through 17 of the network terminal register. Immediately thereafter the information concerning the service task which is performed with respect to that network terminal is written in the Call Register indicated by the memory address in the Network Terminal Register.

A task is considered to be incomplete until such time as the connection is established through the network and the terminating terminal has responded to the call (i.e., the terminating trunk has answered in response to the signaling). An incomplete task is indicated by bit 21 of the first Call Register word being in the "0" state and after answer has occurred, bit 21 is changed to the "1" state to indicate completion of the task.

The generic program has access to the Call Registers and the Network Terminal Registers by way of data found in location ④ of the Program Store 102. The means of access are shown in FIGS. 14A through 14C. As seen in FIG. 14A, an address of a data block in location ⑤ is found at bits 0 through 20 of a Program Store word in location ④ (fixed address area) in the Program Store 102. This memory address defines a Program Store address in the variable portion ⑤ of the Program Store 102. The information in location ⑤ is shown in FIG. 14C. As shown in FIG. 14C, the first word comprises three elements, namely:

(1) The address in location ⑬ of the head cell for Call Registers;
(2) The number of words in each Call Register; and
(3) The number of Call Register groups.

The remainder of the information in location ⑤, relative to Call Registers, comprises a number of words equal in number to the number of Call Register groups. Each such word comprises two portions, namely, a first portion which defines the address in location ⓒ of the first Call Register of the corresponding group and a second portion which defines the number of Call Registers in that group.

The generic program has access to the Network Terminal Registers by means of the information shown in FIG. 14B. There is one Call Store word in location ⓐ for each network frame. Bits 0 through 17 of each such Program Store word define the address in location ⓒ of the first Network Terminal Register of the corresponding network frame.

As previously explained, the Network Terminal Registers are associated on a one-for-one basis with network terminals and since trunk circuits are permanently wired to corresponding trunk terminals there is a one-to-one relationship between a Network Terminal Register and a trunk circuit. The Network Terminal Registers are arranged in ordered groups corresponding to a network frame. The address in memory of a Network Terminal Register corresponding to a network terminal number can be derived. As previously explained with respect to the Call Registers, a network terminal number comprises 15 bits. The seven high ordered bits of that number define a network frame and these bits, when combined with a fixed program constant obtained from memory, define the starting address in memory for the group of Network Terminal Registers associated with a network frame. The eight low ordered bits of the network terminal number define the equipment location within a network frame. Thus, by combining the eight low ordered bits with this starting address in memory, the address of the Network Terminal Register corresponding to a terminal network number is defined.

Another example of the use of a few entries in location ⓑ of the Call Store 103 to permit the generic program to communicate with a block of information in location ⓒ is item (2), the pointers to the network map. The Switching Network 120 in this one illustrative embodiment comprises eight network stages. Four stages are included in each of the Trunk Link Networks 121 and 122. The Switching Network 120 comprises transmission paths, switches for establishing those transmission paths, and control circuits for selectively controlling the switches. Many other telephone switching networks include either lockout provisions for excluding busy links from a new connection or include a sleeve conductor for holding a busy connection and indicating the busy state of the elements of the connection. The Switching Network 120 does not include either lockout arrangements or sleeve connections and as previously noted the availability of elements of the network is indicated by the Network Map which is in location ⓒ of the Call Store 103. The size of the Network Map is a direct function of the traffic handling capacity of the office. The Network Map must include entries for each physical item of the network. Since the Network Map is an item which varies with office traffic handling capacity, it is situated in location ⓒ of the Call Store 103.

Communication between the sequences of the generic program, the sequences of the unique mutually exclusive programs and the Network Map is by way of pointers item (2) which are situated in location ⓑ of the Call Store 103. A word in location ⓑ is reserved for the maximum number of pointers which are required in the generic office. For example, if the maximum number of trunk link networks permissible in a particular class of office is 16, then 16 word locations will be reserved. This arrangement means that a small number of word locations are reserved and not used in the smaller offices of a class. This disadvantage, however, is minor compared to the ease with which additional network capacity may be added to the office and the over-all saving in memory capacity. This is, in accordance with this arrangement the Network map may be distributed throughout a number of call stores and when a new network frame is added. Network Map space need only be assigned in location ⓒ of the Call Store 103 and the pointer word in location ⓑ reserved for the new network frame updated to show the assignment in location ⓒ.

In the case of the Network Map, the amount of memory area required for a network frame is relatively extensive. Therefore, economies may be effected by providing pointers which permit the generic program or the mutually exclusive program to communicate with the Network Map. Where the total memory area required to serve the largest office of a generic class is relatively small, all of the space required to store that data may be reserved in location ⓑ for the largest office of the class. The data for the call signaling scanning program falls into this latter category. In this one illustrative example logic word locations are required for each group of 16 call signaling receivers. Additionally, there are three common call store words required to serve all of the call signaling receivers of an office. The organization of data for the call signaling scanning program is illustrated schematically in FIGS. 12B and 12G. In the illustrative system a scanner is arranged to interrogate a group of 16 supervisory elements in parallel. Such a group of 16 elements is termed herein to reside in a scanner row. The maximum number of call signaling receivers contemplated in the particular class of office illustrated herein is 256. Therefore, a maximum of 16 scanner rows provides sufficient capacity for this maximum number of call signaling receivers.

In FIG. 12B scanner row addresses (CW1) are stored in a maximum of 16 word locations. The scanner row address defines both the scanner in which the row resides and identifies the particular row. In any given office the assigned scanner rows may run only through N; therefore, the word locations in the reserved block of 16 words in excess of N are wasted. However, if the scanner row addresses and the other data for the call signaling scanning program were stored in location ⓒ, pointers would be required in location ⓑ. Accordingly, not all of the words wasted by the arrangement employed herein would be saved. Additionally, the use of pointers to read this data requires additional machine time. Since scanning is a highly repetitive function of the system, minimizing the time required to execute the scanning sequences is extremely important. The economies to be effected by placing the data for the call signaling scanning program in location ⓒ are relatively small; therefore, this data is situated in location ⓑ.

The word blocks W1 through W5 illustrated in FIG. 12B similarly reserve one word per possible scanner row. In these blocks, however, only bit positions 0 through 15 of each word are employed. Within these bit positions the first bit of each word is assigned to the first scanning element of the corresponding scanner row, the second bit position to the second element of the scanner row, et cetera. Accordingly, in these word blocks corresponding bit positions of corresponding rows are assigned to the same scanning element.

The data stored in the block labeled CW2 comprises the address of the associated auxiliary words of the corresponding call signaling receiver registers. As previously noted, call signaling receivers and call signaling receiver registers are associated on a one-for-one basis. In FIG. 12B a single row, for example the "0" row, of each of the words W1 through W5 and CW1 through CW3 corresponds to a group of 16 call signaling receivers. Therefore, there are 16 call signaling receiver registers (FIGS. 12C through 12E) associated with each such row. The words AW1, AW2, and AW3 which comprise a call signaling receiver register are arranged in 48 consecutive word locations in location ⓒ of the Call Store 103. Accordingly, word AW2–1 is removed 16 word locations from word AW1–1 and word AW3–1 is an additional 16 word locations removed from word AW1–1. This arrangement facilitates programming.

The data stored in the block labeled CW3 of FIG. 12B comprises a program return address. That is, in the course of executing the call signaling scanning program a transfer may be made to a sequence to, for example, update one of the counters of the originating registers previously described. After the counter has been incremented, the processor returns to the execution of the call signaling scanning program at the point indicated by the address stored in the block CW3. Again there is one word for each possible scanner row.

There are three common entries shown in FIG. 12G and these are labeled ADR1, ADR2, and ACS1. The scanning of call signaling receivers is performed at timed interrupts. Scanning must be repeated approximately once every 10 milliseconds and in the illustrative system there are odd and even timed interrupts. Successive odd interrupts occur at 10 millisecond intervals and, similarly, successive even interrupts occur at 10 millisecond intervals. Odd and even interrupts occur at 5 millisecond intervals. In the illustrative embodiment approximately one-half of the scanner rows are served at the odd interrupt and the remaining half served at the succeeding even interrupt. Since time is to be minimized, only the word locations associated with the number of scanner rows should be addressed. Accordingly, the word ADR1 shown in FIG. 12G indicates the number of even rows to be scanned at each even interrupt and the word ADR2 indicates the number of odd rows to be scanned at each odd interrupt. The common word SCN1 shown in FIG. 12G is employed by the call signaling scanning program to set an index register which is employed in the course of executing the program.

In summary, since only minor memory space is wasted in any office of a class space is reserved in location Ⓑ for all of the data required for the maximum number of scanner rows; however, since great economies may be effected, the associated call signaling receiver registers are placed in location Ⓒ and communication between the program and these registers is by way of pointers in location Ⓑ.

Translations

In a modern telephone switching system and particularly in a program controlled telephone switching system there are many possible services and features which may be embodied in the operation of both subscribers' lines and trunks. Additionally, in any telephone switching office there must be provision for interpreting call signaling information requesting connections along with means for providing the information required to establish the desired connections. The office parameters, which have been described previously herein, relate to the office as a whole. There is similar data associated with the lines and trunks which defines the characteristics of the associated lines and trunks. This information is termed "translations" herein. Translation information is in location ⑦ of the Program Store 102 and communication between the call processing program sequences and the translation data is by way of pointers in location ⑥ of the program store. These pointers are repeated in the call store (location Ⓑ item 4). The pointers which provide access to the translations are always found at the same absolute addresses in both the program store and the call store for offices of a given generic class. The memory area required to store the office translations varies greatly from office to office. Accordingly, the pointers in locations ⑥ and Ⓑ provide access to other pointers (translation head cells) which are in location ⑦ and which translations thus are not in fixed addresses for all offices. The pointers (translation head cells) in location ⑦ provide access to the various classes of translation.

In summary, the call processing sequences which are found in locations ① and ② of the program store have direct access to the pointers to translation head cells which are found in location ⑥. The call processing program sequences may thus communicate with the translation head cells in location ⑦ and through these head cells can communicate with the various translations found in location ⑦.

The exact translations employed in the illustrative system are not of great significance to the present invention. However, the isolation of the translation data from the memory area which was reserved for the generic program, the generic data, and the unique mutually exclusive programs is of great significance. This isolation permits the operating company to readily change translations to reflect subscribers' service requirements and effects substantial economies since the translations may be distributed through new program stores as the size of an office is increased.

The following discussion is intended to illustrate the types of features which are attributable to lines and trunks and which are implemented by means of translation tables in location ⑦. With regard to lines there are a number of originating classes. For example;

(1) A line may be part of a business group of lines and have restricted calling rights.

(2) A line may be serving a physically handicapped person and every call origination requires the assistance of an operator. This type of line is called a manual origination line.

Similarly, there are a number of terminating classes of lines. For example, one line may be part of a group of lines and in the event that a line in the group which is called is busy, the system must automatically complete a connection to another line of the same group.

The telephone switching office of the illustrative embodiment permits a random association of directory numbers of the office and office equipment; therefore, there must be provision for translating a called directory number to an equipment number so that the central processor may establish the appropriate connection.

There are, similarly, a number of features which may be embodied in a trunk circuit and, additionally, trunks inherently serve different functions such as incoming trunks, outgoing trunks, two-way trunks, operator trunks, special announcement trunks, et cetera. The translations serve to define both the function and the features of the trunks and, additionally, set forth the assignment of output points of the signal distributors, the central pulse distributors, and the scanners to the various trunks.

Although the offices of a class are standardized to the greatest possible extent, there is certain wiring in association of equipments which is done on a per office basis. For example, the assignment of CPD points, scan points, and signal distributor points to various pieces of equipment varies from office to office. Therefore, there are unit translations in location ⑦ which reflect the associations of such equipments.

As previously noted, call signaling information must be interpreted and a path found for establishing the desired connection. This is accomplished by means of the office code translations which are also in location ⑦. The office code translations provide information for routing the call.

SUMMARY OF MEMORY ORGANIZATION

As previously noted herein, there are defined classes of telephone switching offices and for each class of office there is a basic processor configuration and a body of information termed "the generic program" and "the generic data" for that class of office. The basic processor configuration includes certain basic memory arrangements and within this arrangement the generic program and the generic data for a given class of office are always located at the same absolute addresses within the memory.

Further, as explained earlier herein, at the time of installation no two offices could possibly be identical in all characteristics and, additionally, no two offices would grow identically. Advantageously, therefore, the unique characteristics of each office are defined by office parameters (including translations). The office parameters and translations are not intermingled with the generic program and generic data in the memory arrangement. The parameters include a number of types of data which permit the generic program to communicate with various elements of the system which vary from office to office. This data which enables the generic program to communicate varies in content from office to office; however, the data is always placed at identical addresses for all offices of a class. By way of example only, this data includes the following items:
 (1) Head and end cells for register groups;
 (2) Pointers to the Network Map;
 (3) Data for the call signaling scanning program;
 (4) Pointers to translation head cells;
 (5) Feature data; and
 (6) Pointers to data for initializing the call store data.

ANALYSIS AND CORRECTION OF DATA

During call processing, in the absence of errors, there exists a direct correspondence between certain information in the memory and the operational states of the network and trunk elements. This information is contained in the previously described memory areas termed Call Registers, Network Terminal Registers, Network Map (FIG. 7), etc., herein. Upon the occurrence of errors or system faults, the system information in memory may be mutilated or the equipment may be operated incorrectly. In either case, the memory information will not agree with the operational state of the equipment. Within the system a plurality of tests are made on a routine basis to establish whether the system is operating according to plan (i.e., tests to check that the system is cycling at a predetermined rate, tests to check that certain operations do not exceed specified time limits, etc.). If these tests fail, or if maintenance interrupts occur too frequently, the system is forced into an audit mode of operation. There exists a hierarchy of audit modes which are applied to the system in succession upon the recurrence of error conditions. The information operated upon during these audits ranges all the way from generic data information to information particularly associated with calls in progress within the system. Errors in the generic data tables can be corrected by algorithmically restoring the desired information without disturbing calls in progress within the system. However, errors in the Network Map or in other information associated with particular calls in the system cannot be corrected by reference to permanent information available in the system. Errors of this latter type are cumulative and may lead to a rapid degeneration of the call processing capability of the processor.

In accordance with this invention, information associated with calls in progress and the supervisory states of the trunk circuits is analyzed to determine its plausibility, the memory record is made to reflect the results of this analysis and hardware elements of the system are reconfigured to agree with the new memory record.

For the purpose of understanding this invention and particularly for discussion of the analysis which is carried out to determine the plausibility of the information in memory, one must have a conceptual understanding of the nature of the information in memory which is analyzed and the information in memory which is regenerated. The information in memory which admits of analysis comprises the service task information which is found in the Call Registers (FIG. 14D) and the Network Terminal Registers (FIG. 14E). In the absence of errors the information in these registers fully defines the elements of the network and the terminals which are engaged in the performance of a service task and the state of that task, incomplete or complete. The present supervisory states of the trunk are also taken into consideration in determining plausibility of the memory information.

The information modified in accordance with the analysis comprises the Network Map which is a reflection of the states of the network hardware elements, the Trunk State Registers which reflect the states of the trunks, and Call Registers which contain service task information.

In that audit mode in which plausibility test of memory information must be made, all of the content of temporary memory, except recent change information, Call Registers (FIG. 14D) and Network Terminal Registers (FIG. 14E), is erased.

The next step is the initialization of that part of the temporary memory in location Ⓑ of the Call Store 103 which can be derived from information in the semipermanent memory 102.

The next task is to establish which trunks are parts of paths of calls which are in the talking state (active stable state). This is accomplished by scanning the E and N ferrods (FIG. 2) for each trunk of the office. The E ferrod is indicative of the supervisory state (active or inactive) of the trunk as sent by the distant office, the N ferrod is indicative of the operational state (active or inactive) of a network connection to the trunk circuit in this office. When both ferrods indicate an off-hook (active) condition, it is assumed that the examined trunk is associated with a call which is in the talking state. The information thus obtained is stored in temporary memory to build a record of all trunks which are assumed to be currently in use as talking paths. This record is stored in the T1 spots in the variable location Ⓒ (FIG. 7) in the Call Store 103.

The next task is to perform plausibility checks on each of the Call Registers. The Call Registers are contained in dedicated areas of Call Store whose addresses can be derived from permanent information in the system. From information in the Call Register, the addresses of the two associated Network Terminal Registers are derived. The memory address stored in each of the Network Terminal Registers (FIG. 14) is matched against the address of the Call Register being checked. If a mismatch occurs on either of the Network Terminal Registers, the Call Register is restored to the idle or inactive condition. Therefore, only Call Registers with valid assigned network terminal numbers are considered to be active.

The next task is to perform plausibility tests on all Network Terminal Registers. The address of each Network Terminal Register is derived from its associated network terminal number, which network terminal number can be obtained from available permanent information. The Call Progress Mark of each Network Terminal Register (FIG. 14) is examined. If the Call Progress Mark indicates a code other than the code representing the talking state (active stable state), the Call Progress Mark is updated to indicate the idle state (inactive stable state). If the Call Progress Mark indicates the talking state, the first test is to determine if the Call Register address contained in the Network Terminal Register (FIG. 14) lies within a valid predetermined range of addresses. A second test is made to determine if the correct Network Terminal Register address can be derived from information in the specific Call Register whose address is found in the Network Terminal Register under test. A third test is made to verify that the trunk corresponding to the Network Terminal Register under test is found in the previously constructed record of all trunks which are assumed to be in use as talking paths. This test is accomplished by checking that the T1 bit of the corresponding E ferrod is in the off-hook (active) state. If the first, second, or third test fails, the remaining of the three tests will be omitted, and the Network Terminal Register Call Network Progress Mark will be restored to the idle state, the T1 bit of the associated E ferrod will be set to indicat an on-hook (inactive) state and the T2 bit of the associated E ferrod will be set to indicate that the trunk is in a state to accept further service requests. Therefore, the only Network Terminal Registers which have not been idled by the above procedure are those which are associated with a call in the talking state.

In order to prevent further erroneous operations, the system hardware must be made to agree with the memory information deemed plausible by the previously described checks. First the T1 bit of each E ferrod is examined and the corresponding trunk control point is set in the idle state (FIG. 2A) if the T1 bit indicates a "1," and is put in the talking state (FIG. 2A) if the T1 bit is a "0." Secondly, miscellaneous relays including all relays associated with service circuits are released as are all CPD points associated with service circuits.

To prevent further erroneous network operations, the Network Map must be regenerated. The necessary information for regeneration of the Network Map is derived from information deemed plausible by the previously decribed checks without further comparison with the hardware. The Call Register (FIG. 14D) contains all the necessary information (i.e., junctor subgroup identification and network path memory information) to define the corresponding active elements in the Network Map. All active Call Registers are visited in succession and the defined Network Map elements are made active. All network elements which are not indicated to be active by a Call Register are placed in the inactive state.

The final step in the regeneration of temporary memory is the restoral of inactive registers to their respective linked lists.

The network path memory information of the Call Register (FIG. 14D) which is used to reconstruct a Network Map is not vertified by any of the above plausibility checks. However, elements of this information (i.e., junctor subgroup information, originating trunk network terminal number, terminating trunk network terminal number) have been vertified by these plausibility checks. Therefore, the network path memory of the same Call Register is assumed to be correct.

The above method of regenerating temporal information from other information which has been deemed plausible by the above-described tests may result in minor disagreements between the regenerated information and the states of network hardware elements. However, in accordance with this invention, the nature of the disagreements which are possible, advantageously, cannot lead to degenerative disruption of service or to the generation of faulty data. During the course of normal call processing any residual disagreement between the regenerated information and the actual hardware states will be corrected within a very short interval of time.

The preceding discussion clearly shows the concepts of our invention and the detailed procedures which are followed in the implementation of these concepts. The following discussion is intended to relate these concepts and implementation to the operation of the processor which has been previously described. A very detailed discussion of call processing in a program controlled telephone switching system appears in U.S. Patent 2,955,165 which issued on Oct. 4, 1960, and in the priorly noted copending application of Doblmaier et al., Ser. No. 334,875, filed Dec. 31, 1963. Furthermore, there is a discussion of the operation of a program controlled communication switching system in the Bell System Technical Journal, Parts 1 and 2 for September 1964.

The principal input signals to our illustrative communication switching system are the supervisory and call signaling signals which are associated with the trunks of our system. The communication switching system of the copending Doblmaier et al. application serves both lines and trunks and a network providing 2-wire communication paths is shown. The trunk circuits of our illustrative system as previously noted employ 4-wire communication paths and, consequently, the switching network 120 is a 4-wire network.

The Central Processor 100 actively searches for the presence of input signals from the trunk circuits and on a time-shared basis undertakes both the data processing required by such signals and all the work functions necessary to maintain an operating system even though errors and faults may occur during normal operation. These functions other than the call processing associated with the above-noted input signals are termed "maintenance functions" herein. The previously described information analysis, memory regeneration and hardware reconfiguration in accordance with our invention are all classified as maintenance functions.

As described in the copending application of Doblmaier et al., normal call processing is carried out at a base operating level and at timed interrupt levels. That is, work functions (e.g., scanning to define call signaling information) which must be carried out within a realtively rigid time framework are conducted at the timed interrupt levels while other call processing is carried out at the base level. The timed interrupt levels exist in a hierarchy of interrupt levels and the levels of the hierarchy other than the timed interrupts have a higher priority in the interrupt plan. These higher priority interrupts are all reserved for maintenance purposes.

As previously described herein and as fully described in the copending Doblmaier et al. application, there are a number of operational checks which are performed during normal call processing to evaluate the performance of the hardware and to assure normal progression of the program plan. The hardware checks are intended to trigger immediate remedial action (e.g., reread a memory, retransmit a network command, etc.) while the program checks generally lead to a maintenance interrupt. With each such maintenance interrupt there is a prescribed plan for isolating hardware troubles.

In addition to these measures which occur upon detection of trouble, there is a substantial defensive surveillance of the data in memory which is carried out on a time-shared basis with normal call processing at the base level. For example, the generic data tables which can be fully defined on the basis of information in the semi-permanent memory 102 are regenerated from time to time and certain data in memory which admits of simple audit procedures is surveyed to check its plausibility. A detailed analysis of all the data in memory, however, cannot be carried out since this is time-consuming and would be disruptive of normal call processing. Furthermore, the transient called information which is rapidly changing as calls are processed cannot be validated by such procedure. As previously described, there exists a hierarchy of audits which are carried out in response to the detection of trouble in system operation and with each succeeding level of that hierarchy more extensive procedures are performed. At this time we are concerned with the most complex audit of the hierarchy. The lower level audits are all restricted in scope to regeneration of data which can be derived from information in the semipermanent memory and to the limiting of processor actions with respect to certain calls in the transient state.

When the call processing checks have indicated the need for this highest level audit, there is a very high probability that there exists a disagreement between information in memory and the actual states of the hardware elements (e.g., elements of the switching network and the trunks), or that there has been no degeneration of the information in memory which has not been detected by the normal auditing procedures. For example, errors in linking of memory elements such as the originating registers would prevent further normal call processing.

The following description is with respect to the various steps which are carried out in accordance with our invention at the highest level audit. These procedures are all implemented by execution of sequence of program order words. These program sequences permit the Central Control 101 to analyze the information in the Call Store 103 and to control the Master Scanner 144 and the Trunk Scanner 155 to gather new input information, which is employed in the analysis of the information in memory, and further permits the Central Control 101 to control the Central Pulse Distributor 143, the Signal Distributor 156 and the Network Control Circuits 150 and 152 to accomplish reconfiguration of the hardware elements after analysis of data has been completed.

In accordance with the first step of our audit, the Call Store 103 is cleared of all information other than service task information (i.e., Call Registers [FIG. 14D], Network Terminal Registers [FIG. 14E]), and information that cannot be derived from data in the semipermanent memory 102, (i.e., recent change registers). As described with respect to FIG. 14, the program, by way of the address information shown in FIG. 14A, has access to the call register location data shown in FIG. 14C. The information shown in FIG. 14C fully defines that portion of the Call Store 103 in which Call Registers are located. That is, there is shown the address in the Call Store 103 of the head cell for the Call Registers, the number of words in each Call Register and the number of Call Register groups. Furthermore, for each Call Register group there is indicated the address of the first register of the group and the number of registers in the group.

The generic program can define the call store addresses which are dedicated to the Network Terminal Registers by means of thed ata shown in FIG.. 14B. Since Network Terminal Registers in the illustrative embodiment are assigned on a one-for-one basis to the network terminals, there is a separate group of Network Terminal Registers for each network frame. Each network frame accommodates the same number of network terminals. Therefore, each corresponding group of Network Terminal Registers will similarly comprise the same number of registers. The address shown in FIG. 14B comprises the address in the Call Store of the first Network Terminal Register of that group and since the number of registers in a group is fully defined, the portion of the Memory 103 assigned to Network Terminal Registers is also fully defined.

The generic program has access to the recent change register information which must be retained by way of data which is found in location Ⓕ of the Program Store. The recent change registers contain data which redefines translation data contained in the Program Store or supplements that translation data. In either event the recent change registers contain information which reflects the administrative changes with respect to trunks served by the communication switching system. This information is organized with respect to individual trunks. It cannot be redefined from other information available in the memory and, if it is in error, it will be disruptive only with respect to calls involving the corresponding trunk circuit. Accordingly, this information can and, in fact, must be retained to continue normal call processing if the corresponding trunks are to receive future service.

Having defined those areas which are reserved for the data to be retained, the Central Control, by way of a series of commands, sets the remaining areas of the Call Store 103 to the "0" state in preparation for the succeeding analysis, regeneration of the memory to reflect the results of the analysis, the reconfiguration of hardware and subsequent return to normal call processing.

The next step of aur audit is to initialize the information in the Call Store 103 which can be derived from the information in the Semipermanent Memory 102. That is, the Central Control, by execution of prescribed program sequences, reads the data in location Ⓓ of the Program Store 102 and generates the new generic data tables for location Ⓐ of the Call Store 103 and by means of the data found at location Ⓔ of the Program Store 102 regenerates the information in locations Ⓑ and Ⓒ of the Call Store 103. At this point it should be noted that all calls in progress, which have not reached a stable state by the time this audit has been undertaken, will be deemed abandoned and therefore all of the transient call processing registers are set to an idle state and any data previously contained therein erased. Accordingly, when the information in locations Ⓑ and Ⓒ is regenerated, the originating and disconnect registers are all set to the idle state and when call processing is renewed, register assignments are still with the first register of the group as indicated by the head and end cell information in location Ⓑ.

The audit then proceeds to scan both the E and the N ferrods of all trunk circuits to determine those which appear to be engaged in a completed service task (engaged in a call which has reached a stable active state). The results of the scanning are stored in the T1 bits associated with the trunk circuits. The E and N ferrods, 204 and 203 respectively, are shown in FIG. 2. The E ferrods and the N ferrods are organized in pairs for purposes of scanning. Since the Trunk Scanner 155 scans sixteen ferrods at a time, eight such pairs of E and N ferrods are reached by a single command from the Central Control 101 to the Trunk Scanner 155. A ferrod is a two state device; namely, the saturated state and the unsaturated state. The saturated state indicates that current flows or is flowing in the supervised circuit, and the unsaturated state indicates that the supervised circuit is open. The E ferrod is employed to determine the supervisory state of the trunk to the designated office as indicated by information from the associated signaling circuit on the signaling pair 213. If a call has reached an active stable state, the corresponding trunk will be in the off-hook supervisory state and the corresponding E ferrod will be saturated. Similarly, if the call has reached a stable state there will exist a path through the network between the trunk circuit being scanned and another trunk circuit. Accordingly, the N ferrod of that trunk circuit will be in the saturated state. For purposes of this step of the audit, a trunk circuit is considered to be employed in a call which has reached a stable state if both the E ferrod and the N ferrod are found to be in the saturated state. A record is maintained of the trunk circuits by writing a "0" in the T1 spot of that trunk circuit if both the E and the N ferrods are saturated, and by writing a "1" in the T1 spot if either the E or the N ferrod is found to be unsaturated. The T2 bits are set to the complement of whatever state is established in the corresponding T1 bit by this procedure. The T1 and the T2 bits are associated on a one-for-one basis with the E ferrod and there are N1 and N2 bits associated with each N ferrod. The N1 bits at this time are set to the "0" or the "1" state in accordance with the determined states (saturated and unsaturated) of the N ferrod. The N2 bits are each arbitrarily set to the "0" state which indicates that changes in state of the N ferrods are to be ignored. We have now checked all of the hardware which can be verified as to its possible use in a stable call, and must now proceed to an analysis of the information in memory in the light of this newly generated hardware information.

The call registers shown in FIG. 14-D are sequentially examined to determine those which are in an active state and which have originating and terminating trunk network terminal numbers which appear to be valid. A trunk network terminal number is deemed valid for this purpose, if the network terminal register corresponding to that network terminal number has stored therein the address of the call register which is currently being examined. The Central Control proceeds to read the first word of the call register and determines the activity of the register by examination of bit 22 of that word. If bit 22 is in the "1" stage, the call register is idle and steps are taken to insure that the register is, in fact, made available for serving future calls. That is, word 2 of the regitser is set to "0" and the first word is set to the contents of the head cell for call registers. This head cell is found in Location Ⓑ (a fixed location) in the Call Store 103. At the same time, the memory address of the Call Register thus restored to the idle list is written in the head cell in Location Ⓑ.

When a call register is found in the active state as indicated by bit 22 of word 1 being in the "0" state, steps are taken to determine the validity of the contents of that register. As seen in FIG. 14–D, bits 0–14 of the first word of the call register contain the network terminal number of the originating trunk served by that call register. As previously discussed, there exists a network terminal register for every network terminal and, therefore, there exists a network terminal register for every network terminal number of each network frame. The network frame can be determined by reference to a portion of the originating trunk network terminal number. Corresponding to each network frame, there is a head cell in memory corresponding to the first network terminal register for that frame. The address of the memory network terminal register can be obtained by combining the memory address of that first network terminal register for the network frame, with the low ordered bits contained in bit positions 0–7 of the first word in the call register. The Central Control having thus determined the address in the Memory 103 of a Network Terminal Register proceeds to read the memory at that address. Bits 0 through 17 of the word read comprise the memory address of a Call Register. The Central Control compares this address with the address in memory of the Call Register being examined. If there is agreement, bits 0 through 14 of the Call Register are considered to be valid. A similar procedure is followed with respect to the terminating trunk network terminal number which can be derived from bits 0 through 10 of word 2 of the Call Register and bits 15 through 20 of word 1 of the Call Register in conjunction with the originating trunk network terminal number in bits 0 through 14 of word 1. That is, from the junctor subgroup information in bits 15 through 20 and the network frame information concerning the originating trunk in bits 0 through 14 it is possible to define the network frame information for the terminating trunk. The terminating trunk network terminal number is employed to find the location in memory of the first Network Terminal Register for the network frame on which the terminating trunk occurs. In the manner previously described, bits 0 through 7 of the terminating trunk network terminal number indexed on that memory address of the first network terminal register of the frame provides the address of the Network Terminal Register corresponding to the terminating trunk whose network terminal number is contained in the Call Register under examination. That Network Terminal Register is addressed by the Central Control 101 and bits 0 through 17 are matched against the address of the Call Register being examined. If they agree, the contents of that Network Terminal Register are also considered to be valid.

If the contents of either of the Network Terminal Registers (originating or terminating) examined by this process are not determined to be valid, the Call Register under examination is considered to contain implausible information and it is restored to the idle state in the same manner described with respect to a Call Register found in the idle state when it is examined. The examination of the contents of the Call Register proceeds until all registers have been determined to contain plausible or implausible data.

This audit next proceeds to examine the Network Terminal Registers in sequence to determine those registers which are associated with a completed service task (i.e., a call in the talking state which is termed herein "the active stable state"). The talking state is indicated when the Call Progress Mark in bits 18 through 22 [FIG. 14E] of the Network Terminal Register are in the "served by a Call Register" state, the associated T1 bit is in a 0 state indicating a completed task and the Network Terminal Register has a valid Call Register Memory Address contained therein. All Network Terminal Registers which do not conform to the above criteria are set to the idle state as the Network Terminal Registers are sequentially examined.

The contents of a Network Terminal Register are read from memory by the Central Control and bits 18 through 22 are examined to identify those registers in state 4 (served by a Call Register). If a Network Terminal Register is in any of the states 1 through 3, the Call Progress Mark is set to the idle state. A network terminal register which is found to be in state 4 contains in bit positions 0 through 17 the memory address of a Call Register. This Call Register address provides the Central Control with access to a Call Register. The contents of that Call Register are examined to determine whether it contains the network terminal number which corresponds to the Network Terminal Register being examined. The Call Register address in bit positions 0 through 17 of the Network Terminal Register are considered to be valid if the Call Register at that address contains a reference back to the corresponding network terminal. The audit then proceeds to read from memory the state of the T1 bit corresponding to the trunk circuit associated with the Network Terminal Register being examined. If the T1 bit is found to be in the 0 state, the Network Terminal Register is deemed to be engaged in a talking connection (active stable state) and the contents of the Network Terminal Register are retained. The Network Terminal Registers are examined in sequence until all such registers have been found to contain valid information or restored to the idle state.

The above procedure serves to regenerate all data in the Call Store 103 which can be made definite by reference to information contained in the permanent store 102 and by reference to hardware elements of the system and defines the information which is considered to be valid for the purposes of future call processing. Having reached this point, the steps are next taken to reconfigure the hardware elements to conform with the results of this analysis and to bring the network map into conformance with the information considered to be valid.

The trunk circuits are considered in sequence by reading from memory the states of the T1 bits. If the T1 bit of a trunk indicates that the trunk is engaged in a talking connection (active stable state) the CT and the M relays 206 and 205, respectively, should be in the operated state. Accordingly, the Central Control generates successive commands for the Signal Distributor 156 to operate or maintain the CT and M relays in the operated state. If these relays were previously in the operated state, these commands serve no purpose, however, they do assure conformance between the state of the trunk and the state of the memory record. If the T1 bit of a trunk is found to be in the "1" state, the Central Control generates commands for the Signal Distributor 156 to effect release of the CT and M realys to the released states. This procedure is followed until all trunk circuits have been released or placed in the active stable state (talking).

As previously noted herein, all calls in the transient state are removed from the memory record. Accordingly, all service circuits may be returned to the idle state in preparation for resumption of normal call processing. That is, the control relays of all service circuits are reconfigured to place the service circuit in the idle configuration. The memory associated with these service circuits is set to the idle state during the previously described examination of the network terminal registers.

At this point in the audit program there is calculated to be agreement between the states of the trunk circuits and the corresponding records in memory and all that remains to be performed in the regeneration of the network map to conform this record to the stable state call information which appears in the call registers and the network registers which are deemed to contain valid information. The Central Control 101 sequentially reads the contents of each Call Register which has been found to contain valid data and derives from that data the identity of the network elements which are engaged in serving the calls which are recorded in those call registers. The network elements so engaged are indicated to be in the active state in the network map. All other elements of the network are set to the inactive state in the network map.

The Central Processor may now proceed through a sequence of actions which will lead to the resumption of normal call processing. These steps are accomplished by resuming processing at a fixed reference point in the program.

It is to be understood that the arrangements described above in the context of a program controlled communication switching system are merely illustrative of an application of the principles of our invention. As indicated previously herein, our invention is applicable to process control systems in general. Numerous other arrangements may be devised by those skilled in the art without departing from the spirit and scope of our invention.

What is claimed is:

1. A system comprising
    a plurality of hardware elements for performing service tasks with respect to service task demand sources;
    a control arrangement for controlling selectively said hardware elements in accordance with service task demands from said demand sources;
    said control arrangement comprising:
        a memory having a plurality of memory areas defined by addresses and comprising
            a hardware information area for storing hardware information defining the active and inactive states of said hardware elements,
            and a service task information area for storing task information comprising information which defines, for each service task being performed, those of said demand sources with respect to which said service task is being performed and those of said hardware elements selected for performance of said service task;
        means for determining the plausibility of said task information with respect to each service task being performed and for generating plausible and implausible task information plausibility indications;
        and correcting means controlled in accordance with said task information plausibility indications for correcting said hardware information.

2. A system in accordance with claim 1 wherein said control arrangement comprises means for recognizing faulty operation of said system and for generating fault indications which enable said plausibility determining means and said correcting means.

3. A system in accordance with claim 2 wherein said correcting means inactivates those portions of said service task information area determined to contain implausible task information.

4. A system in accordance with claim 2 wherein each said demand source comprises a demand source scan point whose states, active and inactive, indicate the active and inactive states of said demand source and a task check scan point whose states, active and inactive, indicate the operational status, complete and incomplete, of a task result produced by performance of a service task with respect to said demand source;
    said control arrangement further comprises means for ascertaining from said scan points the current state of each of said demand sources and the status of each of said task results,
    and said correcting means comprises means controlled in accordance with said ascertained state and status for inactivating said task information defining a demand source if said demand source is ascertained to be inactive or if said task result produced with respect thereto is ascertained to be incomplete.

5. A system in accordance with claim 4 wherein said task information comprises supervisory information which defines for each said demand source the last ascertained state of said demand source scan point and said task check scan point of said demand source and control information which indicates for each said demand source whether service task demands from said demand source are to be accepted or ignored;
    said correcting means comprises means controlled in accordance with said ascertained current states for updating said supervisory information to define an inactive state for each said demand source if either said demand source scan point or said task check scan point of said demand source is ascertained to be in an inactive state;
    and said task information inactivating means being controlled in accordance with the state defined by said supervisory information.

6. A system in accordance with claim 5 wherein said control information comprises first control information relating to service task demands indicated by the states of said demand source scan points and second control information relating to service task demands indicated by the states of said task check scan points,
    and said correcting means comprises means for setting said second control information to indicate that service task demands indicated by the state of said task check scan points are to be ignored.

7. A system in accordance with claim 6 wherein said correcting means comprises means for setting said demand source scan point supervisory information to define an inactive state for those demand sources defined by task information determined to be implausible and for setting said first control information to indicate that service task demands indicated by the ascertained current state of said demand source scan points are to be accepted for those demand sources defined by task information determined to be implausible.

8. A system in accordance with claim 7 further comprising
    control elements for each said demand source which control the operative state, active or inactive, of said demand source;
    and wherein said control arrangement comprises means controlled in accordance with said updated demand source scan point supervisory information and said fault indications for setting said control elements of each said demand source to a state corresponding to that indicated by said updated demand source scan point supervisory information.

9. A system in accordance with claim 2 wherein said correcting means comprises
    means for initializing said hardware information area to define all said hardware elements as being in an inactive state,
    and means for setting to an active state said hardware information defined by said task information determined to be plausible.

10. A system comprising
    a plurality of hardware elements for performing service tasks with respect to a plurality of service task demand sources;
    a control arrangement for controlling selectively said hardware elements in accordance with service task demands from said demand sources;
    said control arrangement comprising:
        a memory having a plurality of memory areas defined by addresses and comprising
            service task information areas corresponding respectively to said service tasks and defining those of said hardware elements selected to perform said respective service tasks and those of said demand sources with respect to which said respective service tasks are performed, task active-inactive information areas corresponding respectively to said task information areas and indicating whether or not said respective task information areas are currently active, a demand source information area corresponding to each one of said demand sources and defining the address of a task information area assigned to a service task which is being performed with respect to said one demand source;

means for driving from each one of said task information areas assigned to a service task the addresses of the demand source information areas which correspond to said demand sources with respect to which said assigned service task is being performed;

means for comparing the address of said one task information area from which said demand source information area addresses were derived with the task information area address defined by each one of the demand source information areas at said derived addresses and for generating a mismatch indication if any of said compared addresses disagree;

and means controlled in accordance with said mismatch indication for setting said task active-inactive information area corresponding to said one task information area to indicate an inactive state when any of said compared addresses disagree.

11. A system in accordance with claim 10 wherein said control arrangement comprises means for recognizing faulty operation of said system and for generating fault indications which enable said deriving, comparing and setting means.

12. A system in accordance with claim 11 wherein said demand source information area further indicates one of a plurality of stable and unstable progress states relating to current progress in completing said service task being performed with respect to said one one demand source, and said control arrangement comprises changing means controlled in accordance with said fault indications and with an indicated progress state for changing said progress state indication to indicate an inactive stable state if said indicated progress state is other than an active stable state.

13. A system in accordance with claim 12 wherein all said service task information areas are defined by addresses within a specific range of addresses;

said control arrangement comprises validity checking means controlled in accordance with said fault indications for checking whether said task information area address defined by said demand source information area is within said range of addresses and for generating an invalid address indication if said task information area address is outside said range of addresses;

and said changing means is controlled in accordance with said invalid address indication to change said progress state indication to indicate said inactive stable state if said task information area address is ascertained to be outside said range of addresses.

14. A system in accordance with claim 13 wherein said changing means is controlled in accordance with said mismatch indication and said invalid address indication to change said progress state to indicate said inactive stable state if any of said compared addresses previously ascertained to be valid disagree.

15. A system in accordance with claim 14 wherein each of said one of said demand sources comprises a demand source scan point whose states, active and inactive, indicate the active and inactive state of said one demand source and a task check scan point whose states, active and inactive, indicate the operational status, complete and incomplete, of a task result produced by performance of a service task with respect to said one demand source;

said control arrangement comprises means for ascertaining from said scan points the current state of each said demand source and the current status of each said task result;

and said changing means is controlled in accordance with said ascertained current state and status to change said progress state indication to indicate said inactive stable state if said one demand source is ascertained to be inactive or if said task result produced with respect thereto is ascertained to be incomplete.

16. A system in accordance with claim 15 wherein said memory comprises a supervisory information area corresponding to each said one of said demand sources and defining the last ascertained states of said demand source scan point and said task check scan point of said one demand source, and a control information area corresponding to to each said one of said demand sources for indicating whether service task demands from said one demand source are to be accepted or ignored;

said control arrangement comprises means controlled in accordance with said ascertained current scan point states and said fault indications for updating said supervisory information area to define an inactive demand source if either said demand source scan point or said task check scan point is ascertained to be in a currently inactive state;

and said changing means is controlled in accordance with the state defined by said updated supervisory information area.

17. A system in accordance with claim 16 wherein said control information area indicates first control information relating to service task demands indicated by said demand source scan point and second control information relating to service task demands indicated by said task check scan point;

and said control arrangement comprises means controlled in accordance with said fault indications for setting said second control information indications of all said control information areas to indicate that service task demands indicated by the state of said task check scan points of all said demand sources are to be ignored.

18. A system in accordance with claim 16 wherein said control arrangement comprises means controlled in accordance with said fault indications and said mismatch indication for setting said supervisory information area to define an inactive demand source state if said compared addresses disagree and for setting said first control information indication to indicate that service task demands indicated by the ascertained state of said demand source scan point are to be accepted if said compared addresses disagree.

19. A system in accordance with claim 18 further comprising control elements for each one of said demand sources which control the operative state, active or inactive, of said one demand source;

and wherein said control arrangement comprises means controlled in accordance with said fault indications and said updated demand source supervisory information area for setting said control elements of said one demand source to a state corresponding to that defined by said updated supervisory information area.

References Cited

UNITED STATES PATENTS

| | | | |
|---|---|---|---|
| 3,060,273 | 10/1962 | Nowak et al. | 179—27 |
| 3,299,220 | 1/1967 | Wedmore | 179—175.2 |
| 3,375,499 | 3/1968 | Ghiron et al. | 340—172.5 |
| 3,409,877 | 11/1968 | Alterman et al. | 340—172.5 |
| 3,409,879 | 11/1968 | Keister | 340—172.5 |
| 3,411,140 | 11/1968 | Halina et al. | 340—172.5 |

PAUL J. HENON, Primary Examiner

R. J. CHAPURAN, Assistant Examiner